US011939202B2

(12) United States Patent
Tatera et al.

(10) Patent No.: US 11,939,202 B2
(45) Date of Patent: Mar. 26, 2024

(54) SYSTEMS AND METHODS FOR METERING, MIXING, AND DISPENSING LIQUIDS, INCLUDING ALCOHOLIC AND NONALCOHOLIC BEVERAGES

(71) Applicant: Sustainable Beverage Technologies Inc., Golden, CO (US)

(72) Inventors: Patrick J. Tatera, Talkeetna, AK (US); Raphael Broh, Denver, CO (US)

(73) Assignee: Sustainable Beverage Technologies Inc., Golden, CO (US)

( * ) Notice: Subject to any disclaimer, the term of this patent is extended or adjusted under 35 U.S.C. 154(b) by 0 days.

(21) Appl. No.: 17/861,104

(22) Filed: Jul. 8, 2022

(65) Prior Publication Data

US 2022/0371877 A1 Nov. 24, 2022

Related U.S. Application Data

(63) Continuation of application No. PCT/US2021/012781, filed on Jan. 8, 2021.

(Continued)

(51) Int. Cl.
*B67D 1/08* (2006.01)
*B67D 1/00* (2006.01)
(Continued)

(52) U.S. Cl.
CPC ......... *B67D 1/0888* (2013.01); *B67D 1/0037* (2013.01); *B67D 1/0052* (2013.01); *B67D 1/108* (2013.01); *B67D 1/122* (2013.01)

(58) Field of Classification Search
CPC .. B67D 1/0888; B67D 1/0037; B67D 1/0052; B67D 1/108; B67D 1/122; B67D 1/0078;
(Continued)

(56) References Cited

U.S. PATENT DOCUMENTS

| | | | |
|---|---|---|---|
| 2,455,551 | A | 12/1948 | Booth |
| 2,566,436 | A | 9/1951 | Waite |

(Continued)

FOREIGN PATENT DOCUMENTS

| | | | |
|---|---|---|---|
| CN | 102827717 | A | 12/2012 |
| GB | 2 420 553 | A | 5/2006 |
| WO | WO-99/27070 | A1 | 6/1999 |

OTHER PUBLICATIONS

International Search Report dated Apr. 2, 2021, for PCT Application No. PCT/US2021/012781, filed on Jan. 8, 2021, 3 pages.

(Continued)

*Primary Examiner* — Donnell A Long
(74) *Attorney, Agent, or Firm* — COOLEY LLP

(57) ABSTRACT

Systems and methods, including a system for metering, mixing, and dispensing liquids, such as alcoholic and non-alcoholic liquids and solutions, are provided. In one instance, the system includes a controller operatively coupled to a first pump and a second pump. The first pump and the second pump are coupled to a first liquid source and a second liquid source, respectively. The controller controls flow rates at each of the first pump and the second pump. The system includes a valve coupled to a source supply of a third liquid, including pressurized carbonated water. The system includes a fluid connector coupled to the first pump, the second pump, the valve, and a dispenser. The connector receives the first liquid, the second liquid, and the third liquid, such that a fourth liquid, including a combination of the first liquid, the second liquid, and the third liquid, is dispensable from the dispenser.

18 Claims, 10 Drawing Sheets

Related U.S. Application Data

(60) Provisional application No. 62/959,071, filed on Jan. 9, 2020.

(51) Int. Cl.
*B67D 1/10* (2006.01)
*B67D 1/12* (2006.01)

(58) Field of Classification Search
CPC .......... B67D 2001/0089; B67D 1/0892; B67D 2001/082; B67D 2210/00031; B67D 1/0861; B67D 1/06
See application file for complete search history.

(56) References Cited

U.S. PATENT DOCUMENTS

| | | | |
|---|---|---|---|
| 2,655,858 | A | 10/1953 | Hamlin |
| 3,960,066 | A | 6/1976 | Larocco et al. |
| 4,216,711 | A | 8/1980 | Skoli et al. |
| 4,390,035 | A | 6/1983 | Hill |
| 4,737,037 | A | 4/1988 | Mojonnier |
| 4,779,761 | A | 10/1988 | Rudick et al. |
| 4,821,925 | A | 4/1989 | Wiley et al. |
| 4,934,567 | A | 6/1990 | Vahjen et al. |
| 5,476,193 | A | 12/1995 | Haynes |
| 5,501,367 | A | 3/1996 | Chigira |
| 5,738,248 | A | 4/1998 | Green |
| 6,202,894 | B1 | 3/2001 | Struminski et al. |
| 7,757,896 | B2 | 7/2010 | Carpenter et al. |
| 8,251,258 | B2 | 8/2012 | Rudick et al. |
| 8,335,592 | B2 | 12/2012 | Deo et al. |
| 8,678,239 | B2 | 3/2014 | Abdelmoteleb et al. |
| 8,685,477 | B2 | 4/2014 | Almblad et al. |
| 8,889,201 | B2 | 11/2014 | Tatera |
| 8,899,280 | B2 | 12/2014 | Deo et al. |
| 9,487,743 | B2 | 11/2016 | Tatera |
| 9,821,992 | B2 | 11/2017 | Rudick et al. |
| 9,868,929 | B2 | 1/2018 | Tatera |
| 10,077,418 | B2 | 9/2018 | Osborn |
| 10,254,771 | B2 | 4/2019 | Tatera et al. |
| 10,631,560 | B2 | 4/2020 | White et al. |
| 10,674,863 | B2 | 6/2020 | Sevcik et al. |
| 11,592,849 | B2 | 2/2023 | Tatera et al. |
| 2004/0195393 | A1 | 10/2004 | Younkle |
| 2005/0095341 | A1 | 5/2005 | Sher et al. |
| 2006/0097009 | A1 | 5/2006 | Bethuy et al. |
| 2006/0196887 | A1 | 9/2006 | Crisp, III et al. |
| 2007/0177985 | A1 | 8/2007 | Walls et al. |
| 2007/0205220 | A1 | 9/2007 | Rudick et al. |
| 2007/0205221 | A1 | 9/2007 | Carpenter et al. |
| 2008/0073376 | A1 | 3/2008 | Gist et al. |
| 2008/0142548 | A1 | 6/2008 | Moen et al. |
| 2008/0149669 | A1 | 6/2008 | Nicholson et al. |
| 2009/0014464 | A1 | 1/2009 | Adbelmoteleb et al. |
| 2009/0107342 | A1 | 4/2009 | Piscaer et al. |
| 2009/0120960 | A1 | 5/2009 | Schroeder et al. |
| 2010/0047386 | A1 | 2/2010 | Tatera |
| 2010/0147414 | A1 | 6/2010 | Nighy et al. |
| 2010/0163572 | A1 | 7/2010 | Downham |
| 2010/0237099 | A1 | 9/2010 | Carpenter et al. |
| 2011/0006079 | A1 | 1/2011 | Mckay et al. |
| 2011/0121032 | A1 | 5/2011 | Deo et al. |
| 2011/0125334 | A1 | 5/2011 | Deo et al. |
| 2011/0204089 | A1 | 8/2011 | Shettle |
| 2012/0074168 | A1 | 3/2012 | Newman |
| 2013/0092282 | A1 | 4/2013 | Nighy |
| 2014/0166694 | A1 | 6/2014 | Otto |
| 2014/0263407 | A1 | 9/2014 | Rudick et al. |
| 2015/0021356 | A1 | 1/2015 | Witchell et al. |
| 2015/0102062 | A1 | 4/2015 | Mosimann et al. |
| 2015/0114998 | A1 | 4/2015 | Meyer et al. |
| 2015/0120062 | A1 | 4/2015 | McKinzie et al. |
| 2015/0197714 | A1* | 7/2015 | Bartlett .................... C12C 11/11 426/592 |
| 2016/0023883 | A1 | 1/2016 | Jersey |
| 2016/0288064 | A1 | 10/2016 | Tatera et al. |
| 2017/0367522 | A1 | 12/2017 | Ackel et al. |
| 2018/0112160 | A1 | 4/2018 | Tatera |
| 2019/0031985 | A1* | 1/2019 | Chong ................. B67D 1/0462 |
| 2019/0040343 | A1 | 2/2019 | Tatera |
| 2019/0276296 | A1 | 9/2019 | Peirsman et al. |

OTHER PUBLICATIONS

Written Opinion of the International Searching Authority dated Apr. 2, 2021, for PCT Application No. PCT/US2021/012781, filed on Jan. 8, 2021, 9 pages.

* cited by examiner

SYSTEMS AND METHODS FOR METERING, MIXING, AND DISPENSING LIQUIDS, INCLUDING ALCOHOLIC AND NONALCOHOLIC BEVERAGES

CROSS-REFERENCE TO RELATED APPLICATIONS

This application is a continuation of International Patent Application No. PCT/US2021/012781, filed Jan. 8, 2021, entitled "Systems and Methods for Metering, Mixing, and Dispensing Liquids, Including Alcoholic and Non-Alcoholic Beverages," which claims priority to and the benefit of U.S. Provisional Patent Application No. 62/959,071, filed Jan. 9, 2020, entitled "Systems and Methods for Metering, Mixing, and Dispensing Liquids, Including Alcoholic and Non-Alcoholic Beverages," the entire disclosures of each of which are incorporated by reference herein.

BACKGROUND

The present disclosure relates generally to dispensing, and in particular, to systems and methods for metering, mixing, and dispensing liquids, including alcoholic and non-alcoholic liquids.

Shipping certain types of prepared beverages such as alcoholic and non-alcoholic beer can be expensive due to shipping costs associated with the weight and size of the shipped beverages. Additionally, various jurisdictions have regulations to which shipped alcoholic beverages are subject, which commonly results in significant taxes being imposed on certain categories of shipped beverages (e.g., based on the alcohol by volume content of the beverages being shipped).

Accordingly, there is a need for systems and methods for preparing beverages at a point of sale that results in reduced shipping costs and regulatory expenses while maintaining the quality of the alcoholic beverages and increasing the availability of various types of beverages.

SUMMARY

In some embodiments, the system includes a first pump configured to be fluidically coupled to a source of a first liquid including a high density fermented beverage. Further, the system includes a second pump configured to be fluidically coupled to a source of a second liquid including a carrier liquid and a substance having bitterness characteristics. Further, the system includes a controller operatively coupled to the first pump and the second pump such that the controller can control a first flow rate of the first pump and a second flow rate of the second pump. Further, the system includes a valve configured to be coupled to a source supply of a third liquid including pressurized carbonated water. Further, the system includes a flow connector fluidically coupled to the first pump, the second pump, and the valve, the flow connector configured to receive the first liquid, the second liquid, and the third liquid, the flow connector configured to be fluidically coupled to a fluid dispenser such that a fourth liquid including a combination of the first liquid, the second liquid, and the third liquid can travel from the flow connector to the dispenser.

BRIEF DESCRIPTION OF THE DRAWINGS

The drawings are not necessarily to scale. The drawings are merely schematic representations, not intended to portray specific parameters of the invention. The drawings are intended to depict only typical embodiments of disclosed systems, apparatus, and methods. In the drawings, like reference characters refer to like elements (e.g., functionally similar and/or structurally similar elements).

DETAILED DESCRIPTION

In some embodiments, the system includes a first pump configured to be fluidically coupled to a source of a first liquid including a high density fermented beverage. Further, the system includes a second pump configured to be fluidically coupled to a source of a second liquid including a carrier liquid and a substance having bitterness characteristics. Further, the system includes a controller operatively coupled to the first pump and the second pump such that the controller can control a first flow rate of the first pump and a second flow rate of the second pump. Further, the system includes a valve configured to be coupled to a source supply of a third liquid including pressurized carbonated water. Further, the system includes a flow connector fluidically coupled to the first pump, the second pump, and the valve, the flow connector configured to receive the first liquid, the second liquid, and the third liquid, the flow connector configured to be fluidically coupled to a fluid dispenser such that a fourth liquid including a combination of the first liquid, the second liquid, and the third liquid can travel from the flow connector to the dispenser.

Figure 1:
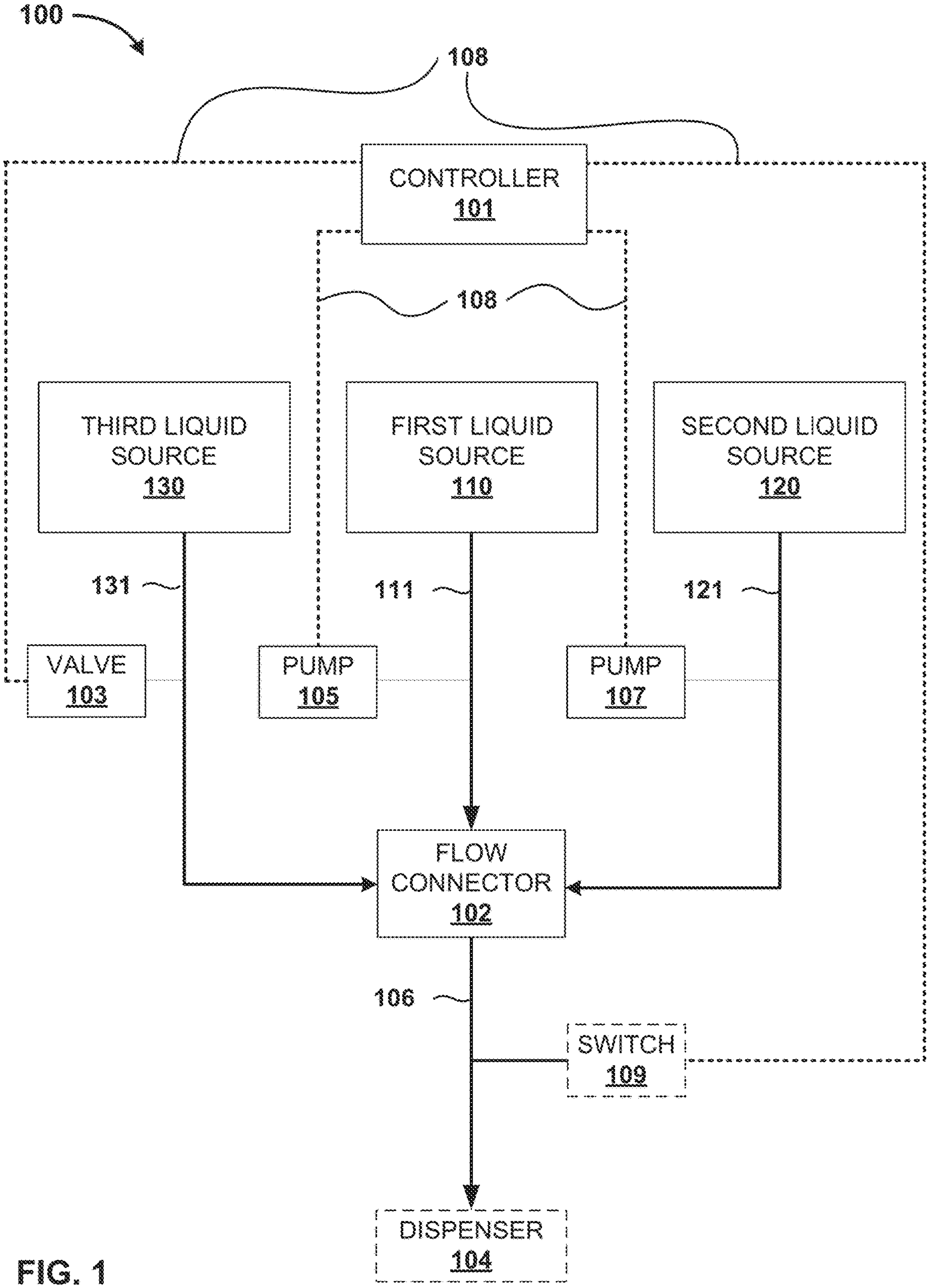
FIG. 1 is a schematic illustration of a liquid dispensing system, according to an embodiment.

FIG. 1 is a schematic illustration of a liquid dispensing system 100, according to an embodiment. The liquid dispensing system 100 includes a pumping assembly including a first pump 105, a second pump 107, and a flow connector 102. The liquid dispensing system 100 also includes a controller 101 and a valve 103. Further, the liquid dispensing system 100 can optionally include one or more of a first liquid source 110, a second liquid source 120, and a third liquid source 130. The first liquid source 110 can be fluidically coupled to the flow connector 102 via a first fluid path

111 (e.g., via one or more tubing portions defining the first fluid path 111). Fluid communication between the first liquid source 110 and the flow connector 102 along the first fluid path 111 can be selectively controlled by the first pump 105. The second liquid source 120 can be fluidically coupled to the flow connector 102 via a second fluid path 121 (e.g., via one or more tubing portions defining the second fluid path 121). Fluid communication between the second liquid source 120 and the flow connector 102 along the second fluid path 121 can be selectively controlled by the second pump 107. The third liquid source 130 can be fluidically coupled to the flow connector 102 via a third fluid path 131 (e.g., via one or more tubing portions defining the third fluid path). Fluid communication between the third liquid source 130 and the flow connector 102 along the third fluid path 131 can be selectively controlled by the valve 103. The flow connector 102 can be fluidically coupled to a fluid dispenser 104 via a fourth fluid path 106 (e.g., via one or more tubing portions). The flow connector 102 can be configured to receive a first liquid from the first liquid source 110, a second liquid from the second liquid source 120, and a third liquid from the third liquid source and to output (e.g., passively) a combination of the first liquid, the second liquid, and the third liquid (also referred to herein as a "fourth liquid" or a "dispensed liquid") for dispensing from the system (e.g., via the dispenser 104).

As shown in FIG. 1, the controller 101 can be operatively coupled to the valve 103, the first pump 105, and the second pump 107. Additionally, the controller 101 can be operatively coupled to a switch 109 associated with the dispenser 104. The switch 109 can be coupled to the dispenser 104 and/or the fourth fluid path 106 such that actuation of the dispenser 104 causes a corresponding actuation of the switch 109. As shown in FIG. 1, the controller 101 can be coupled to the valve 103, the first pump 105, and the second pump 107 via communication paths 108.

The first liquid source 110 can include a supply of the first liquid. The first liquid can include, for example, a high density fermented beverage. In some instances, the first liquid can have a flavor profile having multiple times (e.g., six times) the flavor density of a traditionally-produced beer per unit volume and can have an alcohol by volume content that is similar to a traditionally-produced beer. For example, in some embodiments, the alcohol by volume of the first liquid can range from about 1.5% to about 9.5%. In some embodiments, the alcohol by volume of the first liquid can be, for example, about 2% to about 4%. In some embodiments, the alcohol by volume of the first liquid can be, for example, about 3%. In some embodiments, the alcohol by volume of the first liquid can be, for example, about 2%. In some embodiments, the alcohol by volume of the first liquid can be, for example, about 2.67%. In some embodiments, the first liquid can include a solution that is brewed, fermented, and cellared via any suitable beer brewing process. In some embodiments, the first liquid can be a multi-brewed beverage (e.g., multi-brew beer). In some embodiments, the first liquid can be the same as or similar to any suitable high density fermented beverage, multi-brew beverage, or concentrate described in U.S. Pat. No. 8,889,201, entitled "Method of Making Alcohol Concentrate," filed Aug. 17, 2009, U.S. Pat. No. 10,254,771, entitled "System and Method for Dispensing a Beverage," filed Aug. 19, 2015, and U.S. Patent Publication No. 2019/0040343, entitled "System and Method for Building a High Density Fermented Beverage," filed Aug. 3, 2017, the contents of each of which are hereby incorporated by reference. In some embodiments, the high density fermented beverage can include the ingredients of beer except for ethanol and carbonated water at a higher density than a typical beer. For example, in some embodiments, the high density fermented beverage can include proteins, carbohydrates, sugars, alpha acids, beta acids, tanins, various other acids, etc. at a higher density (e.g., two, three, four, five, six, or seven times the density) than a finished beer product having the same ratio of ingredients. In some embodiments, the first liquid can include a beer concentrate. The first liquid source 110 can include any suitable type of container defining a reservoir. For example, the first liquid source 110 can include a bag defining a reservoir containing the first liquid and/or a bag-in-box containing the first liquid. The first liquid source 110 can include a connector such that the first liquid source 110 can be fluidically coupled to the flow connector 102 via the first fluid path 111.

The second liquid source 120 can include a supply of the second liquid. The second liquid can include a carrier liquid and one or more substances having particular flavor characteristics (e.g., bitterness) (also referred to herein as one or more "additives"). In some embodiments, the second liquid can include alcohol such as, for example, a grain neutral spirit. In some embodiments, the second liquid can be ethanol (e.g., from a grain neutral spirit). In some embodiments, the second liquid can include a clear malt base. The clear malt base can be flavorless and have an alcohol by volume higher than the first liquid. For example, the clear malt base can have an alcohol by volume ranging between about 18% and about 24%. In some embodiments, the second liquid can be non-alcoholic and can include, for example, water (e.g., purified water). In some embodiments, the second liquid can be water. The second liquid source 120 can include any suitable type of container defining a reservoir. For example, the second liquid source 120 can include a bag defining a reservoir containing the second liquid and/or a bag-in-box containing the second liquid. The second liquid source 120 can include a connector such that the second liquid source 120 can be fluidically coupled to the flow connector 102 via the second fluid path 121.

In some embodiments, the second liquid can include an additive having flavor characteristics such that a combination of the second liquid, the first liquid, and/or the third liquid (e.g., a dispensed liquid) has a particular flavor profile and/or particular flavor characteristics. In some embodiments, the carrier liquid (e.g., ethanol, water, clear malt base) of the second liquid can be flavorless or have a flavor sufficiently mild so as to not affect the flavor of the second liquid or of a dispensed liquid including the second liquid in combination with the first liquid and/or the third liquid. In some embodiments, the second liquid can include a bittering agent or a substance having bitterness characteristics. For example, the second liquid can include an additive (e.g., a bittering agent) formed of compounds and molecules such as alpha acids ("alpha acid(s)" or "a-acid(s)"), including, for example, humulones, adhumulones, cohumulones, prehumulones, posthumulones, and/or the like. Additionally or alternatively, the second liquid can include an additive (e.g., a bittering agent) formed of alpha acids and isomers, including, for example, one or more iso-alpha acids (iso-a-acids) such as cis-isohumulone, trans-isohumulone, one or more iso-beta acids and/or the like. Additionally or alternatively, the second liquid can include an additive (e.g., a bittering agent) formed of alpha acids, isomers, and beta acids ((3-acids). Additionally or alternatively, the second liquid can include an additive (e.g., a bittering agent) formed of alpha acids, isomers, beta acids, resins, hops, and/or the like. In some embodiments, the second liquid can include any suitable additive (e.g., a food or beverage additive, flavoring agent, and/or the like) configured to adjust a flavor profile of the dispensed liquid.

In some embodiments, the second liquid can include, for example, a degree or level of bitterness such that, when combined with the first liquid and/or the third liquid to produce the dispensed liquid, the dispensed liquid has a particular degree or level of bitterness. For example, the first liquid can have a first quantity of International Bittering Units ("IBUs") as measured according to the International Bittering Units scale. The second liquid can have a second quantity of IBUs. The dispensed liquid can have a third quantity of IBUs that is associated with a combination of the IBUs in the first liquid and the second liquid. In some embodiments, the second quantity of IBUs of the second liquid can be greater than the first quantity of IBUs. In some embodiments, the bitterness of the dispensed liquid be in the range of 100-120 IBUs. In some embodiments, the first liquid and the second liquid can each include a particular quantity of a bittering agent and/or have a particular quantity of IBUs such that the dispensed liquid has a flavor profile (e.g., an amount of IBUs) that is associated with a particular type of beer (and thus the dispensed liquid is such type of beer). For example, the dispensed liquid can be a stout, IPA, pale ale, Mexican lager, amber, wheat beer, and/or the like. In some embodiments, the ratio of the first liquid to the second liquid in the dispensed liquid can be, for example, 2:1.

In some embodiments, the second liquid can include an amount of alcohol such that, when combined with the first liquid and/or the third liquid to produce the dispensed liquid, the dispensed liquid has a particular amount of alcohol (e.g., per unit volume). For example, as described above, the first liquid can include a first quantity of alcohol and/or first percentage of alcohol per unit volume. The second liquid can include a second quantity of alcohol and/or second percentage of alcohol per unit volume such that when the first liquid, the second liquid, and the third liquid are combined, the total amount or percentage of alcohol in the third liquid per unit volume is a third quantity or percentage. In some embodiments, the first liquid can have a percentage of alcohol per unit volume less than a percentage of alcohol per unit volume of the second liquid. For example, the first liquid can have a percentage of alcohol per unit volume of 3%, and the alcohol percentage of the dispensed liquid can be in the range of 3-8% (e.g., 4.5%) after the addition of the second liquid and the third liquid to the first liquid.

In some embodiments, the second liquid can be non-alcoholic or can have a lower percentage of alcohol per unit volume compared to the first liquid. For example, the first liquid can have a percentage of alcohol per unit volume of 3%, and the alcohol percentage of the dispensed liquid can be about or less than 0.5%. Therefore, in various jurisdictions, the dispensed liquid can qualify as being "non-alcohol" (e.g., non-alcoholic beer), since the percentage of alcohol by volume is equal to or less than 0.5% after the first liquid, the second liquid, and the third liquid are combined. Even if the second liquid is alcohol free, the second liquid can still include a carrier liquid (e.g., water) and a bittering agent such that the dispensed liquid can have a flavor profile (e.g., an amount of IBUs) that is associated with a particular type of beer (and thus be an alcohol-free beer of that type). For example, the non-alcoholic dispensed liquid can be a stout, IPA, pale ale, Mexican lager, amber, wheat beer, and/or the like.

The third liquid source 130 can include a supply of the third liquid. The third liquid source 130 can be a pressurized liquid source. The third liquid can be for example, pressurized carbonated water. The third liquid source 130 can include any suitable type of container or be included in a reservoir defined by any suitable type of container. In some embodiments, the third liquid source 130 can include a chiller unit such as a carbonation chiller unit that is configured to be fluidly coupled to the flow connector 102 and to provide chilled carbonated to the flow connector 102 (via the third fluid path 131). The third liquid source 130 can be pressurized at any suitable pressure configured to deliver pressurized carbonated water to the flow connector 102 for mixing with the first liquid and the second liquid. For example, the third liquid source 130 can be pressurized at a pressure in the range of about 45-75 PSI. In some embodiments, for example, the third liquid source 130 can be pressurized at a pressure of about 60 PSI. In some embodiments, the third liquid source 130 can include a carbonation device, such as a carbonator. For example, the third liquid source 130 can include a carbonator configured to infuse water with carbon dioxide compound under pressure to produce carbonated water. In some embodiments, the third liquid source 130 can be or include a pre-existing or pre-installed pressurized, carbonated water assembly at a point-of-use of the system 100 (e.g., at a site of use such as a bar or restaurant). For example, in some instances, the third liquid source 130 can include a coupling by which the third liquid source can be fluidically coupled to the flow connector (e.g., via the third fluid path).

The controller 101 can include any suitable type of controller, or processing device, configured to run and/or execute instructions, commands, logic, code, software, applications, programs, and/or the like. For example, the controller 101 can include a programmable logic controller (PLC), a voltage controller, and/or the like. As another example, controller 101 can include a hardware-based integrated circuit (IC), a general purpose processor, a central processing unit (CPU), an application specific integrated circuit (ASIC), a field programmable gate array (FPGA), a programmable logic array (PLA), a complex programmable logic device (CPLD), and/or the like. As shown in FIG. 1 and described above, the controller 101 can be operatively and/or communicatively coupled over communications paths 108 to the valve 103, the first pump 105, the second pump 107, and/or the switch 109. The paths 108 can each include any suitable type of communication path, channel, line, and/or the like (e.g., a data communications path, a network connection), including, for example, wired (e.g., optical fiber, copper wire) and/or wireless (e.g., radio, optical) connections, and network elements such as routers, firewalls, switches, gateways, nodes, servers, or the like. In general, each path 108 can include any suitable combination of connections and protocols configured to enable and support interconnection, communication, and interoperation among devices and/or systems, including, for example, the controller 101, the valve 103, the first pump 105, the second pump 107, and/or the switch 109.

In some embodiments, the controller 101 can be configured to be coupled (e.g., wirelessly) to a user device (e.g., user device, operator device). For example, in some embodiments, the controller 101 can be configured to be coupled to the device over a network. In some embodiments, the network can include, for example, an intranet, a local area network (LAN), a personal area network (PAN), a wireless local area network (WLAN) such as a Wi-Fi™ network, a wireless personal area network (WPAN), a wide area network (WAN) such as the Internet, a virtual network, a metropolitan area network (MAN), a worldwide interoperability for microwave access network (WiMAX®), and/or the like. In some embodiments, the network can include, for example, wired (e.g., optical fiber, copper wire) and/or wireless (e.g., radio, optical) connections, and network elements such as routers, firewalls, switches, gateways, nodes, servers, or the like. In general, the network can include any suitable combination of connections and protocols configured to enable and support interconnection, communication, and interoperation among devices and/or systems, including, for example, liquid dispensing system 100 and the user device. The user device can include any suitable type of machine or programmable or electronic device (e.g., a device including a processor and memory), such as a mobile phone, smart phone, computer or compute device (e.g., tablet computer, laptop computer, personal computer, desktop computer, server (e.g., database server, web server), virtual machine, wearable device (e.g., electronic watch), implantable device, and/or the like. In some embodiments, each of the user device and/or the controller 101 can include, for example, a user interface (e.g., a control panel or display), such as a human-machine interface (HMI), a graphical user interface (GUI), or the like. The user device and/or the user interface of the controller 101 can be used to program and/or control operation of the system 100 (e.g., activation and parameters of operation of the first pump 105, the second pump 107, and/or the valve 103, which may be adjusted based on the first liquid source 110 and/or the second liquid source 120 fluidically coupled to the flow connector 102).

The first pump 105 and/or the second pump 107 can be or include any suitable type of fluid pump configured to transfer fluid from the second liquid source 120 or the third liquid source 130, respectively, to the flow connector 102. In some embodiments, the first pump 105 and/or the second pump 107 can include a positive displacement pump such as, for example, a peristaltic pump, a diaphragm pump, and/or a membrane pump. In some embodiments, the first pump 105 and/or the second pump 107 can be driven via a motor (not shown), such as a brushed motor, a brushless motor, a stepper motor, a servo motor, and/or the like. In some embodiments, the first pump 105 and/or the second pump 107 can be driven pneumatically (e.g., in the case of a diaphragm pump).

In some embodiments, the first pump 105 and/or the second pump 107 can each be configured to be driven, for example, via a voltage regulator. For example, the first pump 105 and/or the second pump 107 can be driven via respective voltage regulators that can be set, dialed in, and/or otherwise configured to deliver a specified or predetermined voltage for driving the first pump 105 and/or the second pump 107. In some embodiments, each voltage regulator can be configured such that the first pump 105 and the second pump 107 can be selectively driven to pump liquid from the first liquid source 110 and/or from the second liquid source 120, respectively, at a specified or predetermined flow rate (e.g., based on the specified voltage setting at which the voltage regulator is configured to deliver the voltage to the first pump 105 and/or the second pump 107). In some embodiments, each voltage regulator can be configured to deliver, for example, up to 24 volts (e.g., AC). In some embodiments, each voltage regulator can include any suitable type of voltage regulator.

The valve 103 can be or include any suitable type of valve or flow control device and/or element configured to control a flow of the third liquid from the third liquid source 130 to the flow connector 102. In some embodiments, the valve 103 can be configured to be coupled to an outlet of the third liquid source. In some embodiments, the valve 103 can be configured to be disposed at a location along the third fluid path 131 (e.g., coupled to a portion of a tube forming at least a portion of the third fluid path 131 or disposed between two tubes forming at least a portion of the third fluid path 131). In some embodiments, the valve 103 can include, for example, a gate valve. In some embodiments, the valve 103 can include, for example, a solenoid valve. In some embodiments, the valve 103 can include, for example, a flow regulator, a fluid flow regulator, a fluid flow rate regulator, and/or the like. In some embodiments, valve 103 can include, for example, a pressure regulator, and/or the like. The valve 103 can otherwise include any suitable type(s) of component(s) that can be configured to allow, establish, and/or maintain a particular flow rate and pressure (e.g., via throttling, in conjunction with a pressure regulator, a flow regulator, etc.) so that, for example, the carbonated water is can flow from the valve 103 to the flow connector 102 at a particular flow rate and pressure (or within a particular flow rate range and pressure range) regardless of incoming pressure (e.g., from the third liquid source 130). In some embodiments, the valve 103 can be actuated between an open position and a closed position based on one or more signals or commands received from the controller 101 (e.g., via a communication path 108).

The flow connector 102 can be or include any suitable type of flow connector, fluid connector, coupling, manifold, and/or the like. The flow connector 102 can include three inlets and one outlet. Each of the inlets can be associated with one of the first liquid source 110, the second liquid source 120, and the third liquid source 130. In some embodiments, the flow connector 102 can include, for example, a three-way Y-connector (e.g., having three inlets and one outlet). In some embodiments, the inlets of the three-way Y-connector can be arranged so as to have about a thirty degree inlet convergence angle differential. In some embodiments, the flow connector 102 can include a mixing wye to mix or combine the first liquid, the second liquid, and the third liquid. In some embodiments, the flow connector 102 can include an internal helix (e.g., in-line with an outlet of the flow connector 102). The internal helix can provide for resistance to the flow of the mixture of the first liquid, the second liquid, and the third liquid through the flow connector 102. In some embodiments, the internal helix can be configured to provide an amount of resistance to flow that results in a particular amount of foam being included in the dispensed liquid. For example, the internal helix can be configured to cause the dispense liquid to have about 5% to about 10% of head per serving of the dispensed liquid. In some embodiments, the internal helix can be a two part mixing helix.

The dispenser 104 can be or include any suitable type of fluid dispenser configured to selectively dispense liquid. For example, the dispenser 104 can include a tap coupled to an actuation component such as a lever, a handle, a button, or a switch. The actuation component can be actuated via engagement with the actuation component (e.g., via pulling or pressing) such that a flow operation of the system 100 is initiated. The flow operation of the system 100 can be ceased or paused via a further engagement and/or a disengagement with the actuation component. In some embodiments, the controller 101 can be in communication with the actuation component (e.g., via a switch such as switch 109) such that the controller 101 initiates operation of the first pump 105 and the second pump 107 (e.g., by applying a voltage to each of the first pump 105 and the second pump 107) and/or transitions the valve 103 between a closed configuration and an open configuration in response to engagement or movement of the actuation component. Upon deactivation of the actuation component (e.g., releasing a lever coupled to a tap), the controller 101 can determine that the actuation component was deactivated and, in response, can cease operation of the first pump 105 and the second pump 107 (e.g., by ceasing the application of voltage to each of the first pump 105 and the second pump 107) and/or can transition the valve 103 between the open configuration and the closed configuration. In some embodiments, the dispenser 104 can include a flow measuring device such as a flow meter (e.g., a magnetic flow meter) that can track the total flow of liquid 104 over a given time increment or during use of the system 100.

The switch 109 can include, for example, a sensor and/or switch such as a pressure sensor, a pressure switch, and/or the like. In some embodiments, the pressure sensor can be configured to detect a pressure (e.g., a fluid pressure level) or a change in pressure below a threshold pressure level along the fluid path 106 downstream of the flow connector 102. In some embodiments, the pressure sensor can be configured to be operably coupled to the controller 101. The controller 101 can be configured to initiate operation of the first pump 105 and the second pump 107 (e.g., by applying a voltage to each of the first pump 105 and the second pump 107) and/or transition the valve 103 between a closed configuration and an open configuration in response to the switch 109 detecting a change in pressure below a threshold pressure level along the fluid path 106 (e.g., due to pulling a lever such that an obstruction to flow through the dispenser 104 is removed and fluid can flow freely from a tap of the dispenser 104). The controller 101 can be configured to stop operation of the first pump 105 and the second pump 107 (e.g., by discontinuing application of a voltage to each of the first pump 105 and the second pump 107) and/or transition the valve 103 between an open configuration and a closed configuration in response to the switch 109 detecting a change in pressure above a threshold pressure level along the fluid path 106 (e.g., due to releasing a lever such that an obstruction to flow through the dispenser 104 is replaced and fluid is prevented from flowing from a tap of the dispenser 104).

In use, the actuation component of the dispenser 104 can be actuated. In response, the switch 109 can indicate to the controller 101 that the actuation component has been actuated. The controller 101, in response, can actuate the first pump 105 to draw the first liquid from the first liquid source 110 and deliver the first liquid to the flow connector 102 at a first flow rate and can actuate the second pump 107 to draw the second liquid from the second liquid source 120 and deliver the second liquid to the flow connector at a second flow rate. The first flow rate and the second flow rate can be the same or different from each other. The controller 101, also in response to receiving the indication of actuation of the dispenser 104 from the switch 109, can cause the valve 103 to transition from a closed configuration to an open configuration such that the third liquid can flow from the third liquid source 130 to the flow connector 102. The first liquid, the second liquid, and the third liquid can combine into a fourth liquid in the flow connector 102. The fourth liquid can have any suitable predetermined or preset ratio of the volume of the first liquid to the second liquid to the third liquid. For example, in some embodiments, the fourth liquid can have a ratio of 1 to 0.5 to 4.5 of the first liquid to the second liquid to the third liquid. The fourth liquid can then travel from the outlet of the flow connector 102 to the dispenser 104 and from an outlet of the dispenser 104 (e.g., out of a tap and into a glass or other container). The system 100 can operate such that the fourth liquid continues to flow until a user engaged with the actuation component of the dispenser 104 to stop the flow of the fourth liquid from the dispenser 104, which can cause the controller 104 to stop operation of the first pump 105 (via causing actuation of the switch 109) and the second pump 107 and transition the valve 103 from the open configuration to the closed configuration. The volume of the fourth fluid dispensed from the dispenser 104 can depend on the duration of time between the actuation of the dispenser 104 and the stopping of the actuation of the dispenser 104.

In some embodiments, liquid dispensing system 100 can be configured to mix, blend, or otherwise combine (e.g., before the dispensing) the first liquid, the second liquid, and the third liquid (e.g., at flow connector 102) simultaneously prior to dispensing the fourth liquid. In some embodiments, the liquid dispensing system 100 can be configured to mix the first liquid with the third liquid, and subsequently, to mix the combination of the first liquid and the third liquid with the second liquid. For example, rather than having a single flow connector 102 having three inlets, the system 100 can include a first flow connector and a second flow connector, each having two inlets and one outlet and arranged such that the outlet of the first flow connector is fluidically coupled to an inlet of the second flow connector. In some embodiments, the liquid dispensing system 100 can be configured to mix the second liquid with the third liquid, and subsequently, to mix the combination of the second liquid and the third liquid with the first liquid. Mixing the first liquid, the second liquid, and the third liquid simultaneously and mixing the first liquid or the second liquid with the third liquid prior to adding the other of the first liquid or the second liquid to the mixture can prevent the concentration of alcohol in the combination of liquids from exceeding a predetermined threshold during the mixing operation. The predetermined threshold can include a threshold or limit at or beyond which precipitates (e.g. proteins, carbohydrates) can form and fall out of the solution (e.g., the mixture of liquids).

In some embodiments, the first liquid source 110 and the second liquid source 120 can be included in a liquid input set. Rather than including only one liquid input set (as shown in FIG. 1), the liquid dispensing system 100 can include any suitable number of liquid input sets. For example, in some embodiments, the liquid dispensing system 100 can include as many liquid input sets as available dispensing taps at a point of use. For example, the liquid dispensing system 100 can include two, four, six, eight, or any other suitable number of liquid input sets. In some embodiments, each liquid input set can include a first liquid source that can be the same or similar in structure and/or function to the first liquid source 110, a second liquid source that can be the same or similar in structure and/or function to the second liquid source 120, and, optionally, a container within which the first liquid source and the second liquid source can be disposed. In some embodiments, the container can be formed of cardboard, paperboard, and/or the like. For example, the container can be a cardboard box. In some embodiments, for example, the container can be shaped and sized to receive a flexible bag of the first liquid source 110 containing the first liquid and a flexible bag of the second liquid source 120 containing the second liquid. In some embodiments, liquid dispensing system 100 can include a housing having shelves or racks configured to receive the liquid input sets. The system 100 can include a pumping assembly for each liquid input set. Each pumping assembly can include, for example, a first pump, a second pump, a valve, a flow connector, a first fluid path, a second fluid path, and/or at least a portion of fluid path that can be the same or similar in structure and/or function to the first pump 105, the second pump 107, the valve 103, the flow connector 102, the first fluid path 111, the second fluid path 121, and the third fluid path 106, respectively. The system 100 can include a switch and a dispenser for each liquid input set and pumping assembly that is the same or similar in structure and/or function to the switch 109 and the dispenser 104 described above. The third liquid source 130 can include a fluid path for each flow connector such that the third liquid source 130 can supply the third liquid to each flow connector associated with a liquid input sets.

In some embodiments, the liquid dispensing system 100 can be configured to monitor or detect the volume of liquid dispensed from the dispenser 104. For example, the controller 101 can be configured to monitor the volume of dispensed liquid and associated volume data with a type of dispensed liquid (e.g., a type of beer), a characteristic of the dispensed liquid such as an alcohol content, and/or the like.

In some embodiments, liquid dispensing system 100 can include, for example, a scanner device such as a barcode scanner, and the like. For example, the scanner device can be configured to scan or read a machine-readable identifier (e.g. a bar code, a QR code), such as may be attached or affixed to a container associated with the first liquid and/or the second liquid, and to subsequently generate data ("liquid identifier data" or "liquid identification data") corresponding to information associated with the machine-readable identifier. In some embodiments, the scanner device can be configured to send or communicate the liquid identifier data to controller 101. For example, the scanner device can be operably coupled to controller 101 over a path 108.

In some embodiments, the liquid dispensing system 100 can be configured to be implemented over a network and in conjunction with a user device and one or more Internet-of Things (IoT) devices (e.g. sensors, valves, pumps, switches, etc.). For example, the IoT devices can include devices such as the valve 103, the first pump 105, the second pump 107, and/or the switch 109. In such embodiments, liquid dispensing system 100 can be configured to send or communicate data (e.g., generated at the IoT devices), including, for example, the dispensed liquid data, the source liquid data, and/or the liquid identifier data, as described herein. For example, the liquid dispensing system 100 can be configured to send or communicate the data to a user device and over a network. In such embodiments, the liquid dispensing system 100 can be configured to communicate the data to the user device in the form of an update, alert, or notification associated with the dispensed liquid data, the received liquid data, and/or the liquid identification data. In some embodiments, the liquid dispensing system 100 can be configured to indicate a need for (e.g., based on a passed time duration) and/or to execute an automated cleaning operation (e.g., automated line cleaning operation). For example, the liquid dispensing system 100 can be configured to receive, from the user device and at controller 101, data corresponding to a command configured to cause liquid dispensing system 100 to execute the automated cleaning operation. In this example, liquid dispensing system 100 can be configured to send, to the user device and by way of controller 101, data associated with the execution of the automated cleaning operation, including, for example, data corresponding to workflow or status tracking of the operation. In some embodiments, liquid dispensing system 100 can include a housing (not shown) and a support (not shown). The housing and the support can include any suitable type of housing and/or support, configured to house, enclose, mount, or support one or more components of liquid dispensing system 100.

In some embodiments, the system 100 can be configured to use feedback from components of the system 100 to adjust the voltage delivered to the first pump 105 and the second pump 107 to achieve a particular flow rate of liquid from the first liquid source 110 and the second liquid source 120 to the flow connector 102. For example, the controller 101 can adjust a level of voltage that is delivered to a first motor operatively engaged with or included in the first pump 105 and/or to a second motor operatively engaged with or included in the second pump 107 based on data the controller 101 receives indicating the actual revolutions per minute (RPMs) of the first motor or the second motor, respectively. In some embodiments, the first motor driving the first pump 105 and/or the second motor driving the second pump 107 can each be configured to communicate their respective actual revolutions per minute to the controller 101 via communication paths 108. For example, each of the first motor and the second motor can be coupled to or include an RPM sensor, a microprocessor, and/or a communication interface (e.g., an antenna and transceiver or a wired input/output port) such that RPM data of the first motor can be collected and communicated to the controller 101. Thus, in use, if the controller 101 receives data or a notification indicating that the first motor or the second motor is operating at a rotational speed (e.g., RPMs) outside of a threshold range (e.g., below a target rotational speed), the controller 101 can adjust the level of voltage sent to the first motor or the second motor to increase or decrease the rotational speed. Therefore, the system 100 can adjust for variations in specific fluid dynamics (e.g., liquid density and viscosity) in, for example, different styles and batches of the first liquid in the first liquid source that may otherwise slow the first motor of the first pump 105, thus ensuring that the flow rate of liquid from the first liquid source 110 and the second liquid source 120 are consistently within a target range or about a target threshold regardless of the properties of the first liquid.

In some embodiments, a kit can include one or more components of the system 100. For example, in some embodiments, a kit can include some of the components shown and described with respect to FIG. 1, which may be configured to be coupled to other of the components shown and described with respect to FIG. 1 that are available at a point of use of the system 100. For example, in some embodiments, a kit can include the first pump 105, the second pump 107, the valve 103, the flow connector 102, the controller 101, the first fluid path 111, the second fluid path 121, the third fluid path 131, and the fourth fluid path 106. In some embodiments, a kit can include the first pump 105, the second pump 107, the valve 103, the flow connector 102, the controller 101, the first fluid path 111, the second fluid path 121, the third fluid path 131, the fourth fluid path 106, the first liquid source 110, and the second liquid source 120. In some embodiments, a kit can include any suitable number of liquid input sets and pumping assemblies. In some embodiments, a kit can include any suitable number of liquid input sets and any suitable components of the system 100.

Figure 2:
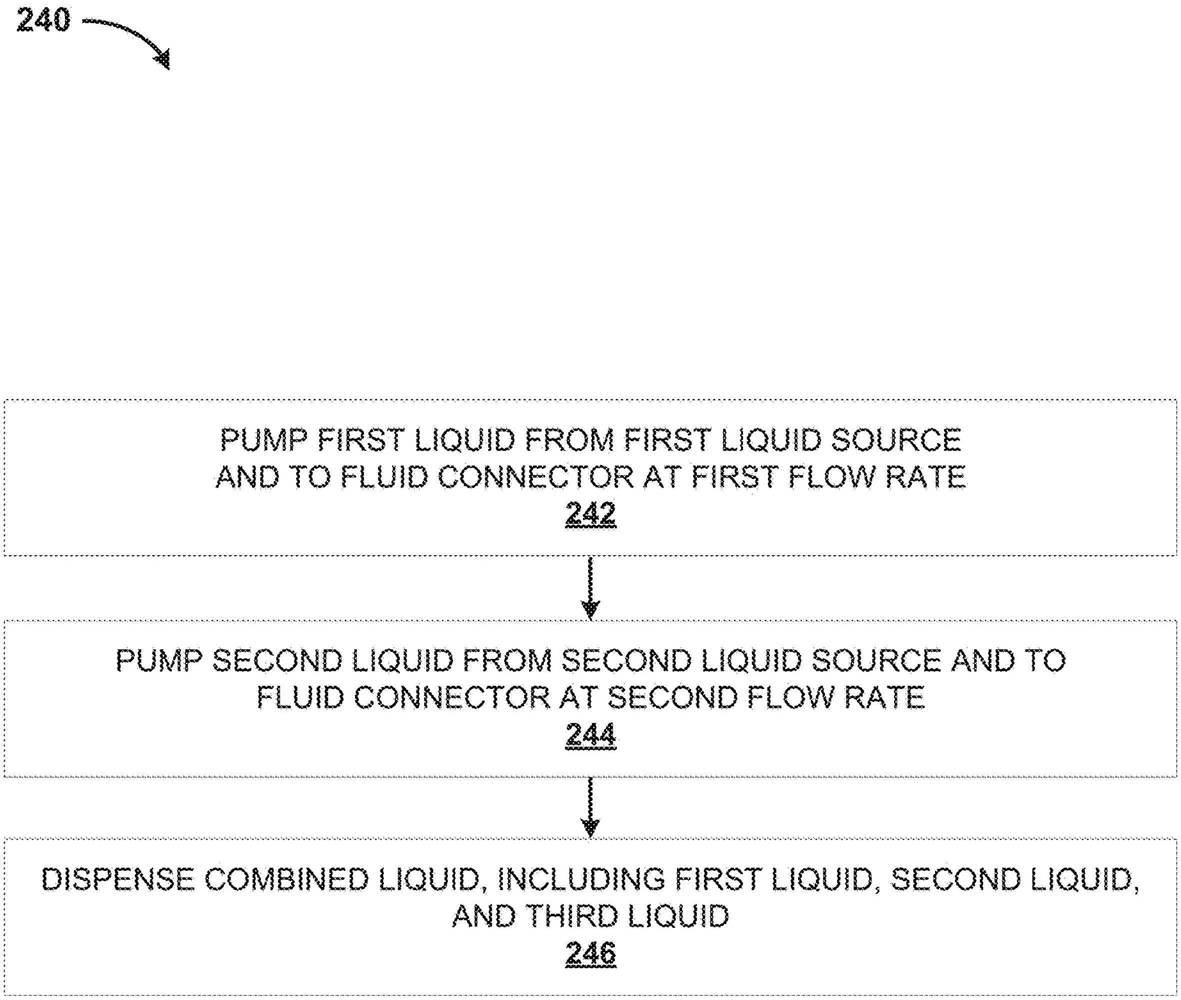
FIG. 2 is a flowchart depicting an example of a method of operating a liquid dispensing system, according to an embodiment.

FIG. 2 is a flowchart depicting an example of a method ("method 240") of operating a liquid dispensing system (e.g., liquid dispensing system 100), according to an embodiment. The liquid dispensing system can include a liquid dispensing system configured to meter, mix, and dispense liquid, including, for example, alcoholic liquid, non-alcoholic liquid, and/or the like, such as liquid dispensing system 100, as described herein. For example, the method 240 can be implemented in operating the liquid dispensing system to meter, mix, and/or dispense liquids, including, for example, alcoholic liquid, non-alcoholic liquid, and/or the like, as described herein.

At 242, the method 240 includes pumping (e.g., via the first pump 105) a first liquid at a first flow rate, such as from a source of the first liquid (e.g., the first liquid source 110) and to a flow connector (e.g., the flow connector 102). In some embodiments, the first liquid can include, for example, a high density fermented beverage. At 244, the method 240 includes pumping (e.g., via the second pump 107) a second liquid at a second flow rate, such as from a source of the second liquid (e.g., the second liquid source 120) and to the flow connector. In some embodiments, the second liquid can include, for example, a carrier liquid and a substance having bitterness characteristics, such as described herein. In some embodiments, the third liquid can be received, such as at the fluid connector, from a supply of the third liquid (e.g., liquid source 130). Optionally, in some embodiments, a valve (e.g., the valve 103) can be transitioned from a closed state to an open state such that a third liquid flows from a source of the third liquid (e.g., the third liquid source 130) to the fluid connector. In some embodiments, the third liquid can include, for example, pressurized carbonated water.

At 246, the method 240 includes dispensing (e.g., via the dispenser 104) a combined liquid (also referred to herein as a "fourth liquid" or a "dispensed liquid") including the first liquid, the second liquid, and a third liquid. In some embodiments, the pumping of the first liquid and/or the pumping of the second liquid can be initiated (e.g., at controller 101), for example, upon or responsive to a signal from a pressure sensor (e.g., the switch 109) disposed downstream of the fluid connector detecting a fluid pressure level downstream of the pressure sensor being below a threshold fluid pressure level.

In some embodiments, the first liquid, the second liquid, and the third liquid can be combined simultaneously, such as within the fluid connector, to form and/or provide the combined liquid. In some embodiments, the first liquid or the second liquid can be combined with the third liquid before being combined with the other of the first liquid or the second liquid. For example, the first liquid can be combined with the third liquid, and, subsequently, the combination of the first liquid and the third liquid can be combined with the second liquid. As another example, the second liquid can be combined with the third liquid, and, subsequently, the combination of the second liquid and the third liquid can be combined with the first liquid. In some embodiments, dispensing the combined liquid can include, for example, actuating or pulling a lever coupled to a tap (e.g., at an outlet of the liquid dispensing system 100) such that the combined liquid flows from the tap.

Figure 3:
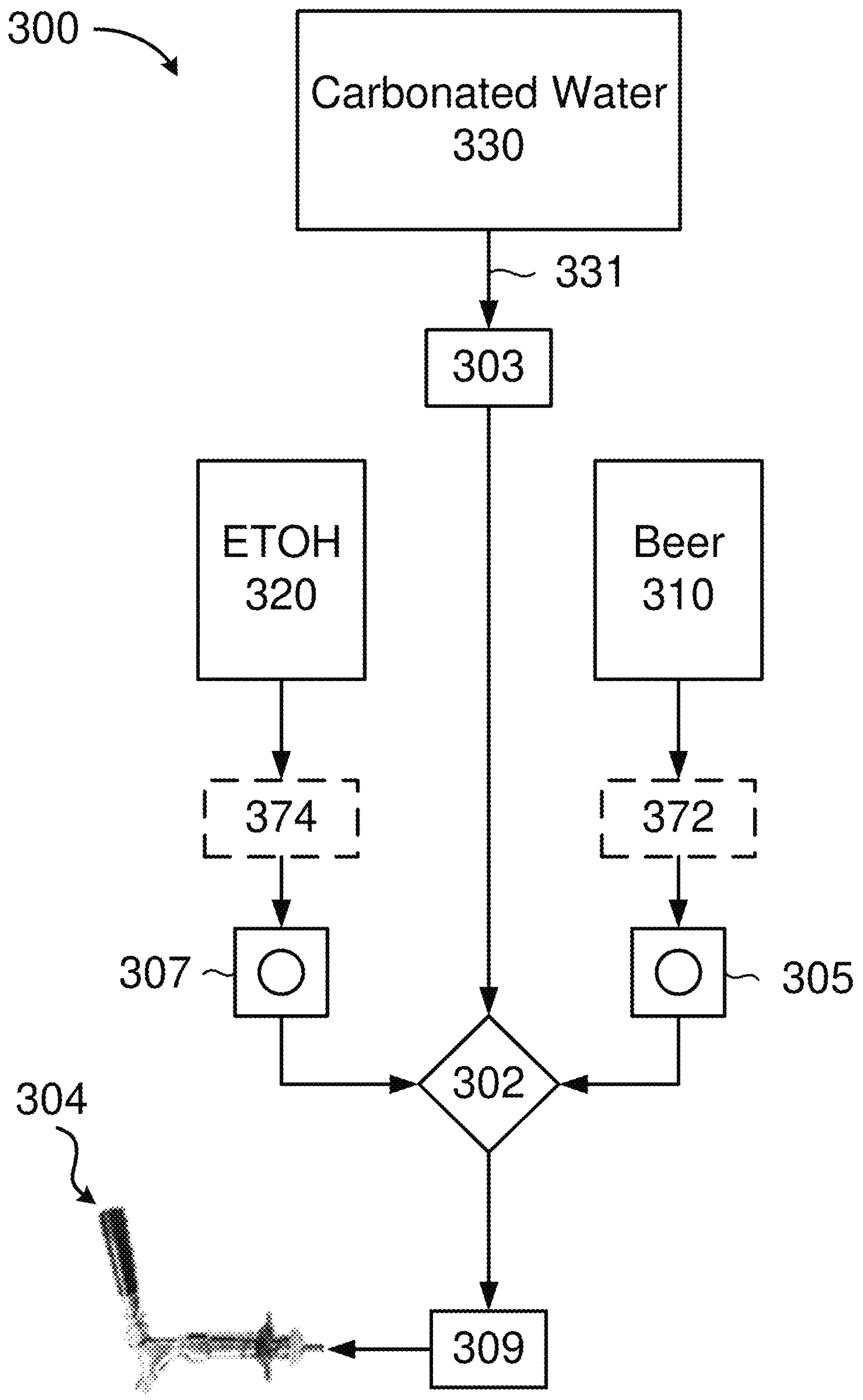
FIG. 3 is a schematic illustration of a liquid dispensing system, according to an embodiment.

FIG. 3 is a functional block diagram depicting a liquid dispensing system 300, according to an embodiment. The liquid dispensing system 300 can be the same or similar in structure and/or function to the liquid dispensing system 100 shown in FIG. 1 and described above. For example, the liquid dispensing system 300 can be configured to meter, mix, and dispense liquid, including, for example, alcoholic liquid and/or non-alcoholic liquid.

As shown in FIG. 3, the liquid dispensing system 300 can include a first liquid source 310, a second liquid source 320, and a third liquid source 330. The first liquid source 310, the second liquid source 320, and the third liquid source 330 can be the same or similar to any of the first liquid sources, the second liquid sources, and the third liquid sources described herein, respectively, such as the first liquid source 110, the second liquid source 120, and the third liquid source 130. The liquid dispensing system 300 also includes a flow connector 302, a switch 309, and a dispenser 304. The flow connector 302, the switch 309, and the dispenser 304 can be the same or similar in structure and/or function to any of the flow connectors, switches or dispensers described herein, respectively, such as the flow connector 102, the switch 109, and the dispenser 104. As shown in FIG. 3, the first liquid source 310 can be coupled to the flow connector 302 via a first vacuum switch 372 and a first pump 305. The second liquid source 310 can be coupled to the flow connector 302 via a second vacuum switch 374 and a second pump 307. The first pump 305 and the second pump 307 can be the same or similar in structure and/or function to any of the pumps described herein, such as the first pump 105 and the second pump 107, respectively. The third liquid source 330 can be coupled to the flow connector 302 via a valve 303. The valve can be the same or similar in structure and/or function to any of the valves described herein, such as the valve 103.

As shown in FIG. 3, the first vacuum switch 372 can be disposed between the first liquid source 310 and the first pump 305, and the second vacuum switch 374 can be disposed between the second liquid source 320 and the second pump 307. The first vacuum switch 372 and/or the second vacuum switch 374 can be or include any suitable type of switch, flow control switch, transducer (e.g., sensor), and/or the like. For example, the first vacuum switch 372 and/or the second vacuum switch 374 can include a switch such as a pressure sensor, a pressure switch, a vacuum sensor, a vacuum switch, a negative pressure switch, a suction switch, and/or the like. The first vacuum switch 372 and the second vacuum switch 374 can be configured to control fluid communication between the first fluid source 310 and the first pump 305 and the second fluid source 320 and the second pump 307, respectively. For example, the first vacuum switch 372 and the second vacuum switch 374 can be configured to be normally closed and to open in response to detecting a predetermined low pressure threshold to thereby establish fluid communication between the first fluid source 310 and the first pump 305 and the second fluid source 320 and the second pump 307, respectively.

In some embodiments, the first vacuum switch 372 and/or the second vacuum switch 374 can be configured to actuate (e.g., open or close) in response to sensing a predetermined threshold ("predetermined threshold vacuum" or "predetermined threshold pressure") at a point along a fluid path they are coupled. For example, a first point (e.g., at which the first vacuum switch 372 can be configured to actuate in response to sensing the predetermined threshold vacuum) can be located at or proximate an inlet to the first pump 305. A second point (e.g., at which the second vacuum switch 374 can be configured to actuate in response to sensing the predetermined threshold vacuum) can be located or proximate at an inlet to the second pump 307.

In some embodiments, the first vacuum switch 372 and/or the second vacuum switch 374 can be configured to be operably coupled to a controller (not shown), such as over a communication path similar to paths 108 those described herein with reference to FIG. 1. For example, the controller can be configured to receive, from the first vacuum switch 372 and/or the second vacuum switch 374, data associated with a detected vacuum or pressure level or a detected configuration of the first vacuum switch 372 and/or the second vacuum switch 374. In some embodiments, if the pressure through a fluid line to which one of the first vacuum switch 372 and/or the second vacuum switch 374 is coupled drops below a threshold pressure level because a liquid source coupled to that fluid line has been depleted, the pressure drop can cause the first vacuum switch 372 and/or the second vacuum switch 374 to open. The first vacuum switch 372 or the second vacuum switch 374 opening causes a circuit in which the first vacuum switch 372 and the second vacuum switch 374 are included to be open, causing power to the controller, the first pump 305 and/or the second pump 307 to be disrupted. As a result, the first pump 305 and/or the second pump 307 cease operation.

Figure 4:
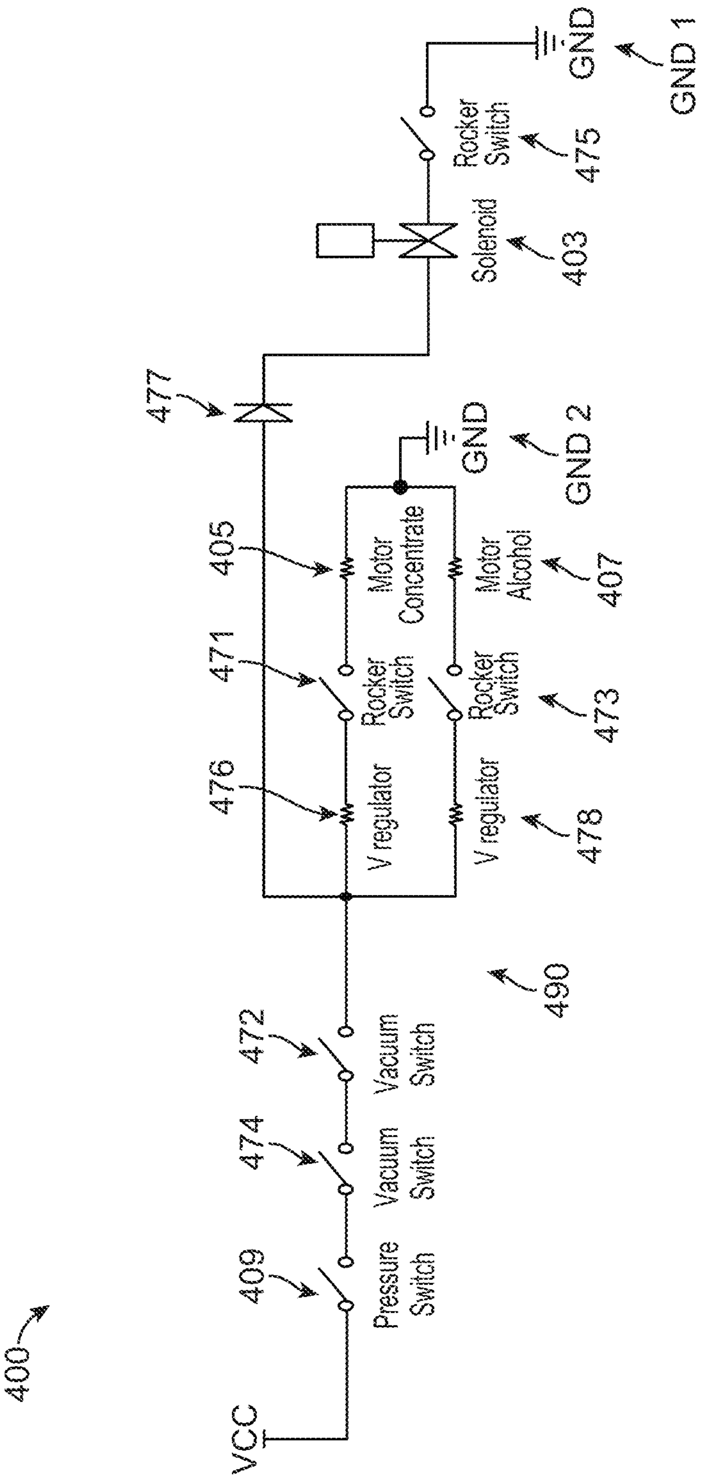
FIG. 4 is a schematic illustration of a circuit diagram for an electrical circuit that can be used in a liquid dispensing system such as the liquid dispensing system shown and described with reference to FIG. 3, according to an embodiment.

FIG. 4 is a depiction of an example of a circuit diagram for an electrical circuit system 400 that can be used or included in any of the liquid dispensing systems described herein, such as the liquid dispensing system 300, as shown and described with reference to FIG. 3. As shown, the system 400 includes a positive supply voltage Vcc configured to be connected to ground (e.g., to first ground GND 1 and to second ground GND 2) via switches (e.g., a pressure switch 409, a vacuum switch 472, a vacuum switch 474, a first rocker switch 471, a second rocker switch 473, and a third rocker switch 475), a first voltage regulator 476, a second voltage regulator 478, a first pump 405, a second pump 407, and a solenoid valve 403. The first rocker switch 471, the second rocker switch 473, and the third rocker switch 475 are configured in the electrical circuit system 400 such that the first voltage regulator 476 and/or the second voltage regulator 478 can be calibrated and/or the voltage settings of the first voltage regulator 476 and/or the second voltage regulator 478 can be changed without liquid being dispensed (e.g., due to operation of the first pump 405 and/or the second pump 407). When the first rocket switch 471, the second rocker switch 473, and the third rocker switch 475 are off (e.g., open), power will not reach the first pump 405 or the second pump 407, but a control panel (not shown) (e.g., of a controller such as the controller 101) associated with the first voltage regulator 476 and the second voltage regulator 478 can still be active. Thus, with the first rocket switch 471, the second rocker switch 473, and the third rocker switch 475 open, the control panel can be used to calibrate and/or change the voltage settings of the first voltage regulator 476 and/or the second voltage regulator 478. To operate the system to dispense liquid, the first rocket switch 471, the second rocker switch 473, and the third rocker switch 475 can be closed such that power can travel across the first rocket switch 471 and the second rocker switch 473 to power the first pump 405 and the second pump 407. The solenoid valve 403 can be the same or similar to the valve 303 in the system 300.

The positive supply voltage Vcc can be connected to ground GND 1 by way of any suitable type of path (e.g., an electrically conductive path) via the pressure switch 409, the vacuum switch 472, the vacuum switch 474, and the first voltage regulator 476, the rocker switch 471, and the first pump 405 or the second voltage regulator 478, the rocker switch 473, and the second pump 407. In particular, the pressure switch 409, the vacuum switch 472, and the vacuum switch 474 are connected in series. Although the pressure switch 409, the vacuum switch 472, and the vacuum switch 474 are shown as being arranged in a particular order, the pressure switch 409, the vacuum switch 472, and the vacuum switch 474 can be arranged in any suitable order (e.g., the order of the vacuum switch 472 and the vacuum switch 474 can be reversed). The vacuum switch 472 can be a vacuum shutoff switch disposed between a first liquid source (e.g., a liquid source such as the first liquid source 110). The vacuum switch 472 can be located between the first liquid source and the first pump 405. The vacuum switch 474 can be a vacuum shutoff switch disposed between a second liquid source (e.g., a liquid source such as the second liquid source 120). The vacuum switch 474 can be located between the second liquid source and the second pump 407. The pressure switch 409 can be the same or similar in structure and/or function to any of the pressure switches described herein, such as the pressure switch 109 and/or 309. Moreover, the first voltage regulator 476, the first rocker switch 471, and the first pump 405 (also referred to collectively as "the first subcircuit") are connected in series with one another, and, collectively, are connected in parallel with the second voltage regulator 478, the rocker switch 473, and the second pump 407 (also referred to collectively as "the second subcircuit"), which are connected in series. The positive supply voltage Vcc is connected to ground GND 2 via the diode 477, the solenoid valve 403, and the third rocker switch 475, which are connected in series.

Figure 5:
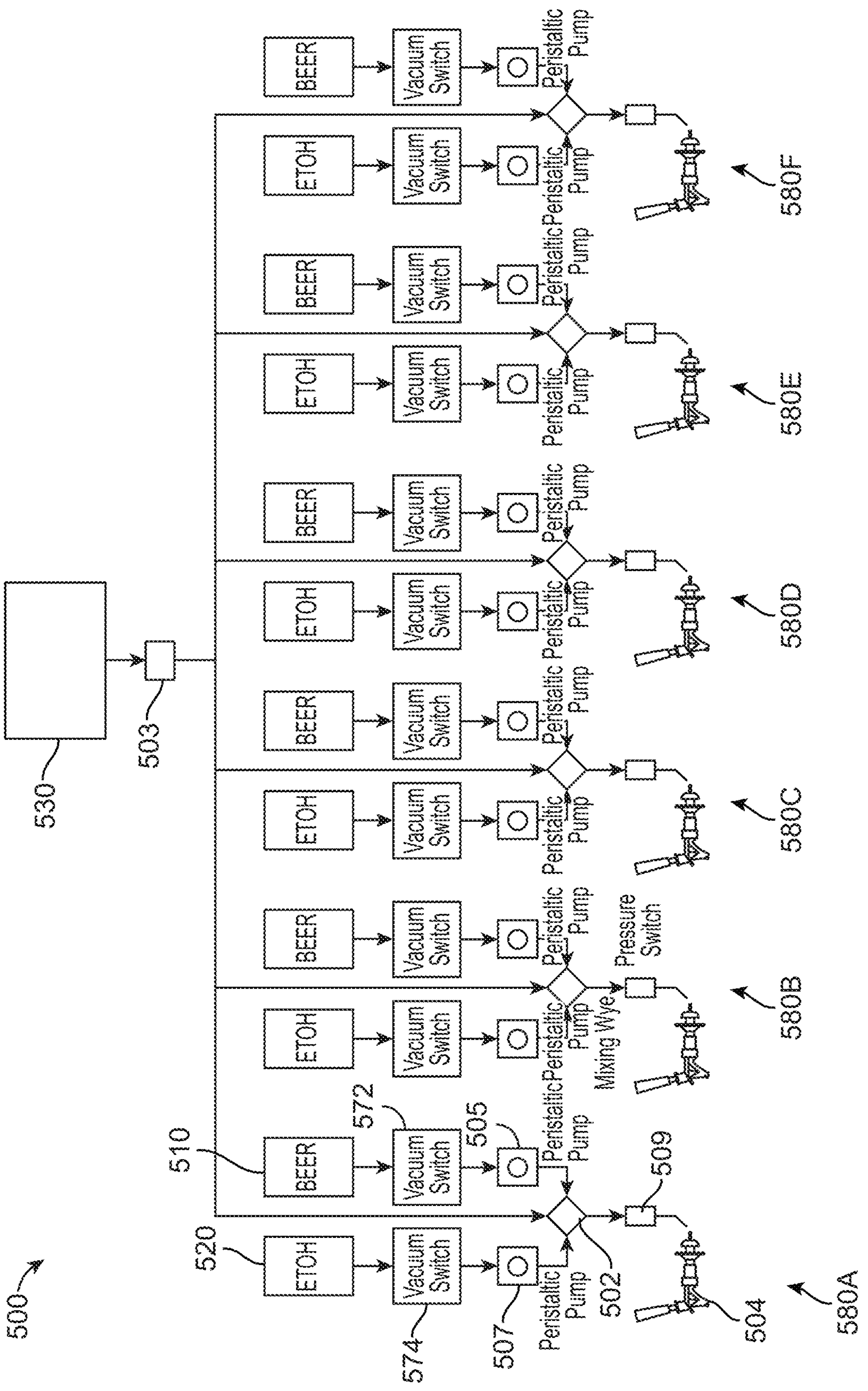
FIG. 5 is a schematic illustration of a liquid dispensing system, according to an embodiment.

FIG. 5 is a functional block diagram depicting a liquid dispensing system 500, according to an embodiment. The liquid dispensing system 500 can be the same or similar in structure and/or function to any of the liquid dispensing systems described herein, such as the liquid dispensing system 100. For example, the liquid dispensing system 500 can be configured to meter, mix, and dispense liquid, including, for example, alcoholic liquid and/or non-alcoholic liquid.

As shown in FIG. 5, the liquid dispensing system 500 can include six subassemblies (i.e., a first subassembly 580A, a second subassembly 580B, a third subassembly 580C, a fourth subassembly 580D, a fifth subassembly 580E, and a sixth subassembly 580F). Each of the subassemblies can be the same or similar in structure and/or function to the similar components of the liquid dispensing system 300. For example, the first subassembly 580A includes a first liquid source 510 and a second liquid source 520. The first liquid source 510 and the second liquid source 520 can be the same or similar to any of the first liquid sources and the second liquid sources described herein, respectively, such as the first liquid source 110 and the second liquid source 120. The subassembly 580A also includes a flow connector 502, a switch 509, and a dispenser 504. The flow connector 502, the switch 509, and the dispenser 504 can be the same or similar in structure and/or function to any of the flow connectors, switches or dispensers described herein, respectively, such as the flow connector 302, the switch 309, and the dispenser 304. As shown in FIG. 5, the first liquid source 510 can be coupled to the flow connector 502 via a first vacuum switch 572 and a first pump 505. The second liquid source 510 can be coupled to the flow connector 502 via a second vacuum switch 574 and a second pump 507. The first pump 505 and the second pump 507 can be the same or similar in structure and/or function to any of the pumps described herein, such as the first pump 305 and the second pump 307, respectively. Each of the subassemblies can be the same or similar in structure and/or function to the first subassembly 580A.

The liquid dispensing system 500 includes a third liquid source 330 that can be coupled to a flow connector (e.g., the flow connector 502) of each of the subassemblies via a valve 503. The valve 503 can be the same or similar in structure and/or function to any of the valves described herein, such as the valve 303. When the dispenser 504 is actuated (e.g., via actuation of an actuation component such as a lever), a third liquid can flow from the third liquid source 530, through the flow connector 502, and out of the dispenser 504. Although not shown, the system 500 can include a controller. The controller can be the same or similar to the controller 101 described above. The controller can be operatively coupled to suitable components of each subassembly.

Figure 6:
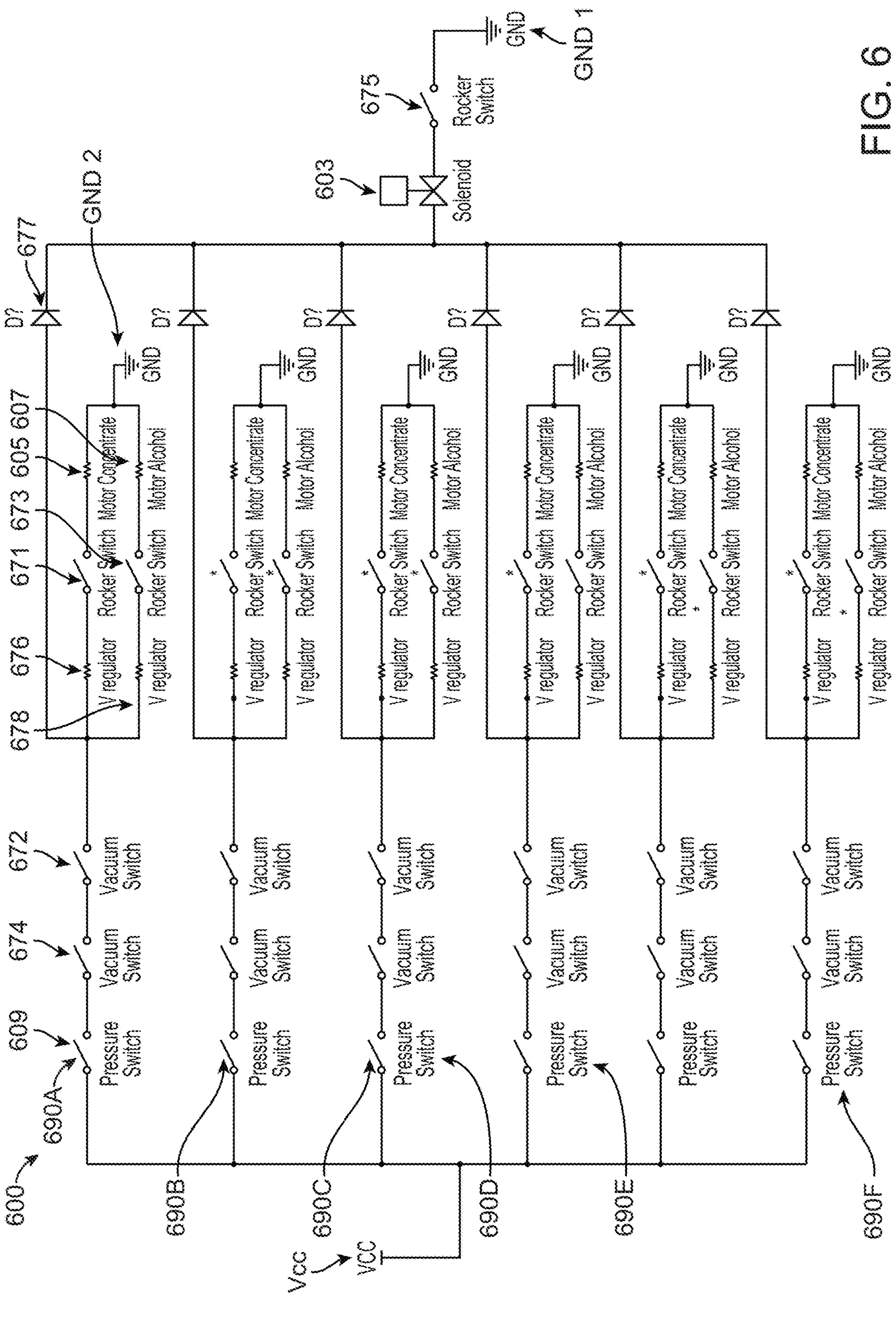
FIG. 6 is a schematic illustration of a circuit diagram for an electrical circuit that can be used in a liquid dispensing system such as the liquid dispensing system shown and described with reference to FIG. 5, according to an embodiment.

FIG. 6 is a depiction of an example of a circuit diagram for an electrical circuit system 600 that can be used in any of the liquid dispensing systems described herein, such as the liquid dispensing system 500, as shown and described with reference to FIG. 5. Additionally, the system 600 can be functionally and/or structurally similar to the system 400, as described herein. As shown in FIG. 6, the liquid dispensing system 600 can include six subassemblies (i.e., a first subassembly 690A, a second subassembly 690B, a third subassembly 690C, a fourth subassembly 690D, a fifth subassembly 690E, and a sixth subassembly 690F). Each of the subassemblies can be the same or similar in structure and/or function to the similar components of the liquid dispensing system 400. For example, the first subassembly 690A, a pressure switch 609, a vacuum switch 672, a vacuum switch 674, a first rocker switch 671, a second rocker switch 673, a third rocker switch 675, a first voltage regulator 676, a second voltage regulator 678, a first pump 605, a second pump 607, a diode 677, and a solenoid valve 603. The solenoid valve 603 can be the same or similar in structure and/or function to any of the valves described herein, such as valves 103, 303, 403, and/or 503. The pressure switch 609 can be the same or similar in structure and/or function to any of the pressure switches described herein, such as the pressure switch 109, 309, 409, and/or 509. Each of the subassemblies can be the same or similar in structure and/or function to the first subassembly 690A and can receive voltage from Vcc.

Figure 7:
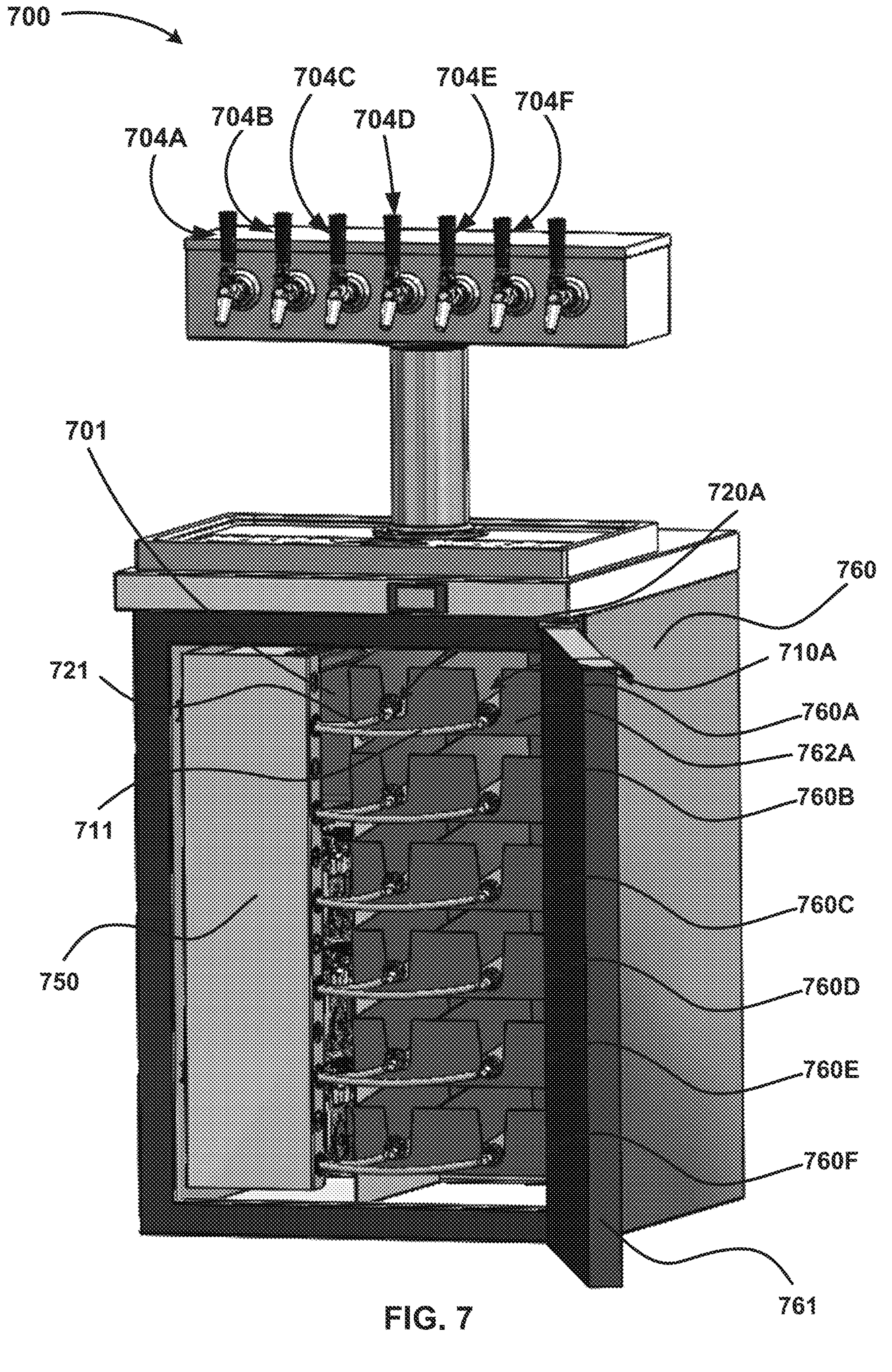
FIG. 7 is a depiction of an example of a perspective view of a liquid dispensing system, according to an embodiment.

FIG. 7 is a perspective view of a liquid dispensing system 700, according to an embodiment. The liquid dispensing system 700 can be the same or similar in structure and/or function to any of the liquid dispensing systems described herein. The liquid dispensing system 700 also includes a housing 760 having a door 761, a support assembly 750 (also referred to as a "panel" or a "panel assembly"), and a number of dispensers 704A-704F. The liquid dispensing system 700 can include a number of liquid input sets that are the same or similar in structure and/or function to any of the liquid input sets described herein. As shown, the liquid dispensing system 700 includes a first liquid input set 760A, a second liquid input set 760B, a third liquid input set 760C, a fourth liquid input set 760D, a fifth liquid input set 760E, and a sixth liquid input set 760F. Each of the liquid input sets can be associated with a dispenser 704 of the dispensers 704A-704B. Each of the liquid input sets can include a first liquid source and a second liquid source, which each may be the same or different then the first liquid sources and the second liquid sources of the other liquid input sets. As shown, the first liquid set 760A, for example, can include a carboard box 762A, a first liquid source 710A (e.g., containing a high density fermented beverage contained in a bag), and a second liquid source 720A (e.g., containing a carrier liquid and a bittering agent container in a bag). The first liquid source 710A can be coupled to a first fluid tube 711 such that the first liquid can flow from the first liquid source 710A via the first fluid tube 711. The second liquid source 720A can be coupled to a second fluid tube 721 such that the second liquid can flow from the second liquid source 720A via the second fluid tube 721. Each of the liquid input sets can be stacked within the housing 761 (e.g., on shelves or racks).

The housing 760 can be or include any suitable type of housing having one or more supports and configured to house, enclose, mount, or support one or more components of liquid dispensing system 700. For example, as shown in FIG. 7, the housing 760 can include an interior or enclosure configured to removably receive the support 750. The interior or enclosure of the housing 760 can be configured to slidably or movably receive the support 750, such as through the front opening of the housing 760. In some embodiments, the support 750 can include a metallic or composite slider, such as a stainless steel slider, and the like. The housing 760 can include or be configured to define an interior, including, for example, a plurality of shelves, mounts, supports, and/or the like (collectively, "shelf(ves)"). In some embodiments, a support (e.g., the support 750) including a plurality of shelves can be configured to support or receive one or more liquid input sets from a plurality of liquid input sets disposed thereon, as described herein. In some embodiments, the housing 760 can be configured to receive the support within the interior. For example, the housing 760 can be configured to receive the support, including each liquid input set from the plurality of liquid input sets disposed thereon (e.g., on a shelf), in the interior, as described herein.

Figure 8:
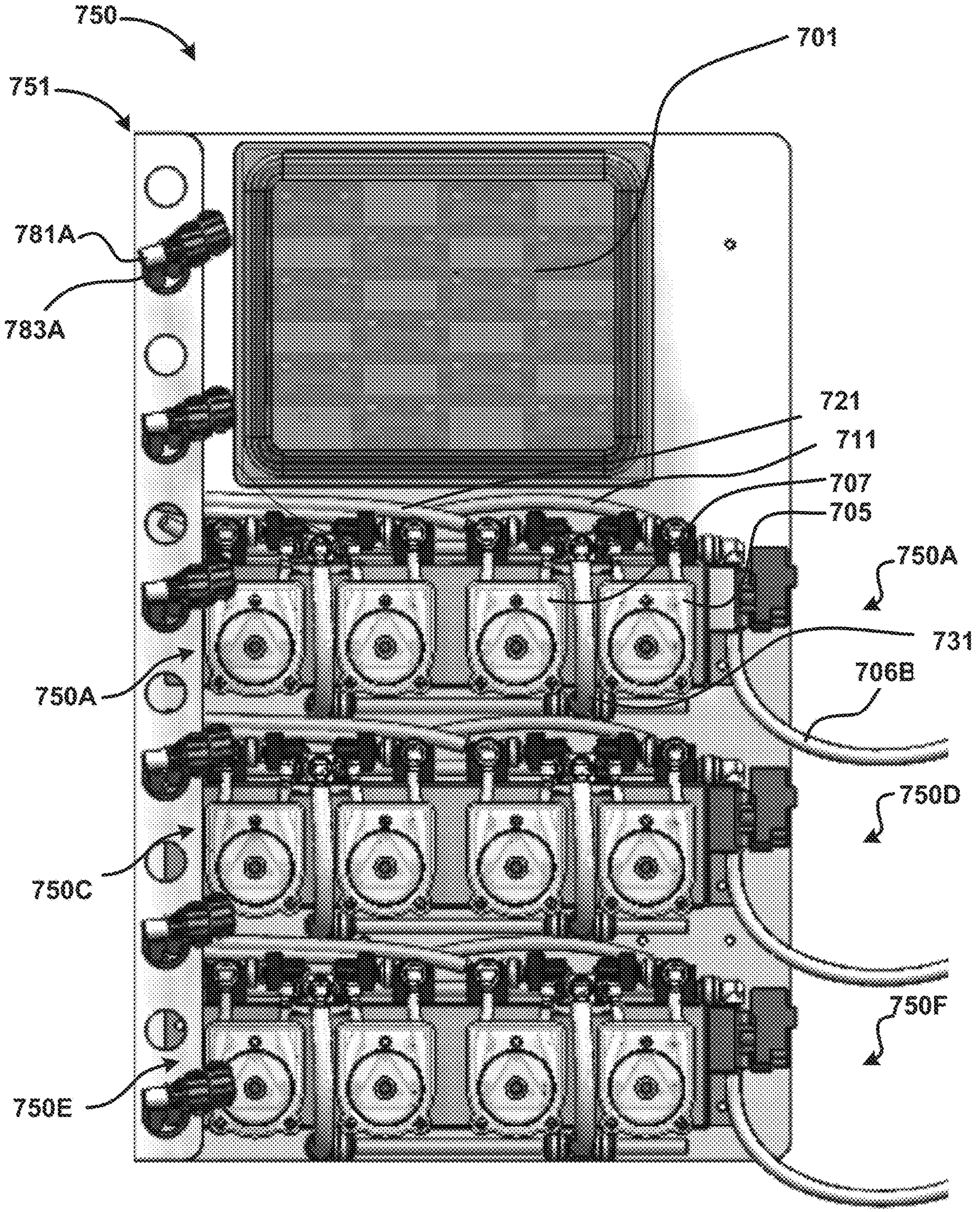
FIG. 8 is a depiction of an example of a panel assembly included in the liquid dispensing system depicted in FIG. 7.

FIG. 8 is a side view of the support assembly 750 of the liquid dispensing system 700. The support assembly 750 can include a flange 751 defining a number of openings through which fluid tubes can be routed to couple with fluid tubes coupled to a liquid input set, such as the liquid input set 760A. The support assembly 750 also include a controller 701, which can be the same or similar in structure and/or function to any of the controllers described herein (e.g., the controller 101). The controller 701 can be mounted and/or supported by the support assembly 750 can be operatively coupled to a plurality of pumping assemblies supported by the support assembly 750 such that the controller 701 can control a flow rate of each pump included in each pumping assembly of the plurality of pumping assemblies. As shown, the support assembly 750 can include six pumping assemblies (e.g., a first pumping assembly 750A, a second pumping assembly 750B, a third pumping assembly 750C, a fourth pumping assembly 750D, a fifth pumping assembly 750E, and a sixth pumping assembly 750F). Each of the pumping assemblies can be the same or similar in structure and/or function to any of the pumping assemblies described herein. For example, each of the pumping assemblies can include a first peristaltic pump 705 and a second peristaltic pump 707. A first fluid line 711 from a first connector 781A is coupled to the first peristaltic pump 705 and is configured to receive fluid form the first liquid source 710A. A second fluid line 721 from a second connector 783A is coupled to the second peristaltic pump 707 and is configured to receive fluid from the second liquid source 710B. A third liquid can be delivered to each pumping assembly (e.g., via the third fluid line 731).

Figure 9:
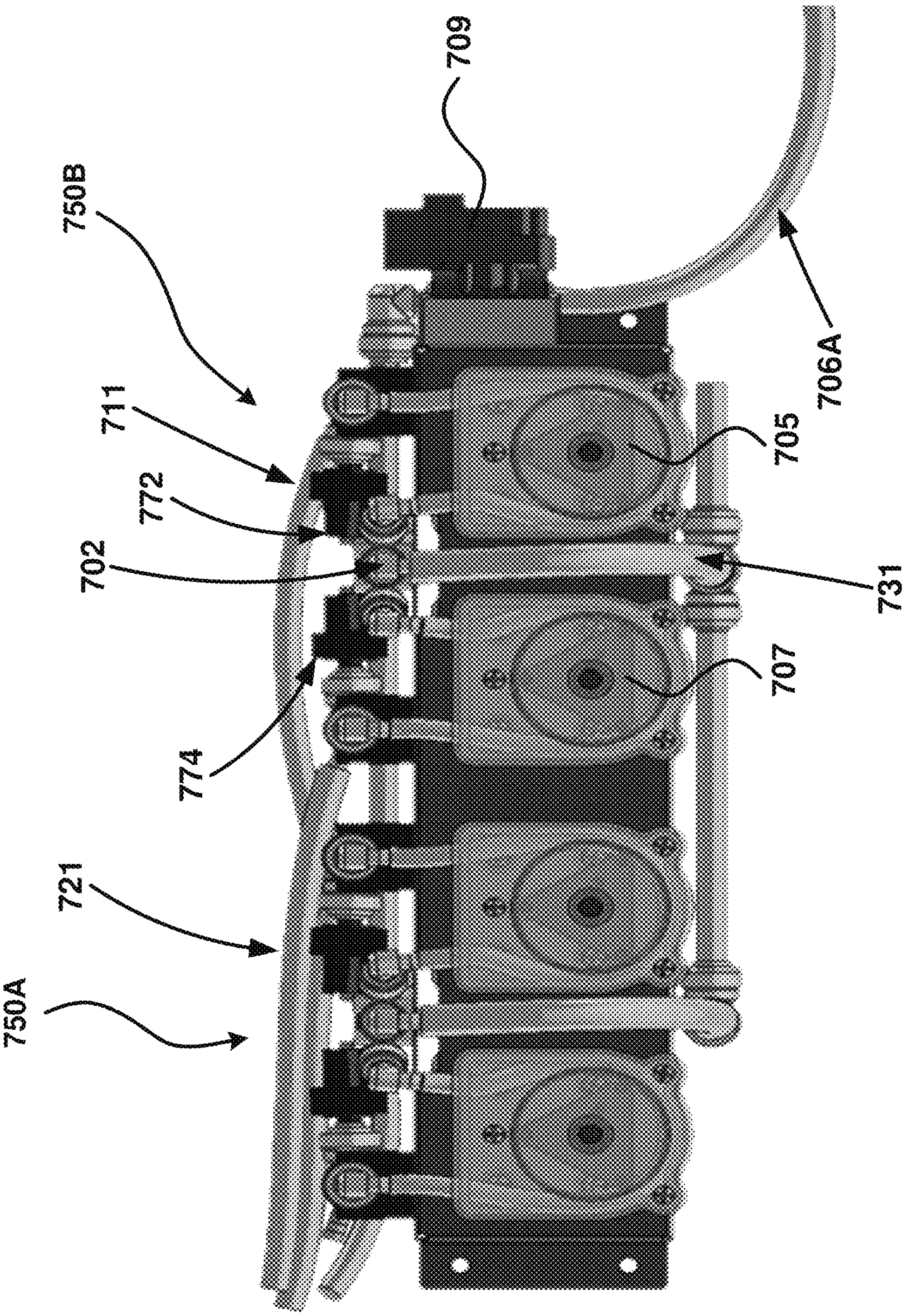
FIG. 9 is a schematic depiction showing an example of a pumping assembly of the liquid dispensing system depicted in FIG. 7.

FIG. 9 is a side view of a first pumping assembly 750A and a second pumping assembly 750B, which can both be mounted to the same support rack. As shown in FIG. 9, the outlet of the first pump 705 can be coupled to a first inlet of a flow connector 702 via a first vacuum shut-off switch 772. The first vacuum shut-off switch 772 can be the same or similar in structure and/or function to the switch 472 in FIG. 4 and/or the switch 672 in FIG. 6. The outlet of the second pump 707 can be coupled to a second inlet of the flow connector 702 via a second vacuum shut-off switch 774. The first vacuum shut-off switch 774 can be the same or similar in structure and/or function to the switch 474 in FIG. 4 and/or the switch 674 in FIG. 6. The third fluid line 731 coupled to a third liquid source (not shown) can be couple to a third inlet of the flow connector 702. An outlet of the flow connector 702 can be coupled to a fourth fluid line 706A via a solenoid pressure switch 709. The solenoid pressure switch 709 can be coupled to the second fluid dispenser 704B via the fourth fluid line 706A. The solenoid pressure switch 709 can be or include a normally closed solenoid valve. The valve of the solenoid pressure switch 709 can be configured to protect against backflow of liquid in the fourth fluid line 706A while the system 700 is not actively dispensing. The valve of the solenoid pressure switch 709 can also be configured to protect against forward flow from the third liquid source (e.g., a carbonated water source) through the third fluid line 731 and the flow connector 702 due to pressure build up from carbon dioxide break out while the system 700 is not actively dispensing. Thus, the valve of the solenoid pressure switch 709 can be configured to be normally closed, and can be opened under control of the controller 701 to allow fluid to flow from the flow connector 702 to the a fluid dispenser 704 associated with the second pumping assembly 750B (e.g., the second fluid dispenser 704B) in response to an actuator (e.g., a tap) of the fluid dispenser 704 being actuated. The pressure switch 709 can be included in an electrical circuit of the system 700 and configured such that the pressure switch 709 is "open" when a tap handle associated with the pressure switch 709 is in an non-actuated configuration and such that the pressure switch 709 is closed in response to the tap handle being actuated (e.g., opened). In the closed position, the circuit can be completed such that current can flow through the switch 709 to other components of the system 700 (e.g., the first pump 705 and the second pump 707). The pressure switch 709 can be the same or similar in structure and/or function to any of the pressure switches described herein, such as the pressure switch 109, 309, 409, 509 and/or 609.

As shown in FIG. 7, the fluid dispensers 704A-F can be included in a tower and can be, for example, attached at, to, or about an outer surface of the housing 760. In some embodiments, the liquid dispensing system 700 can be configured to be used in conjunction with a long draw system, a long draft beer draw infrastructure, a draft beer infrastructure, and/or the like.

Figure 10:
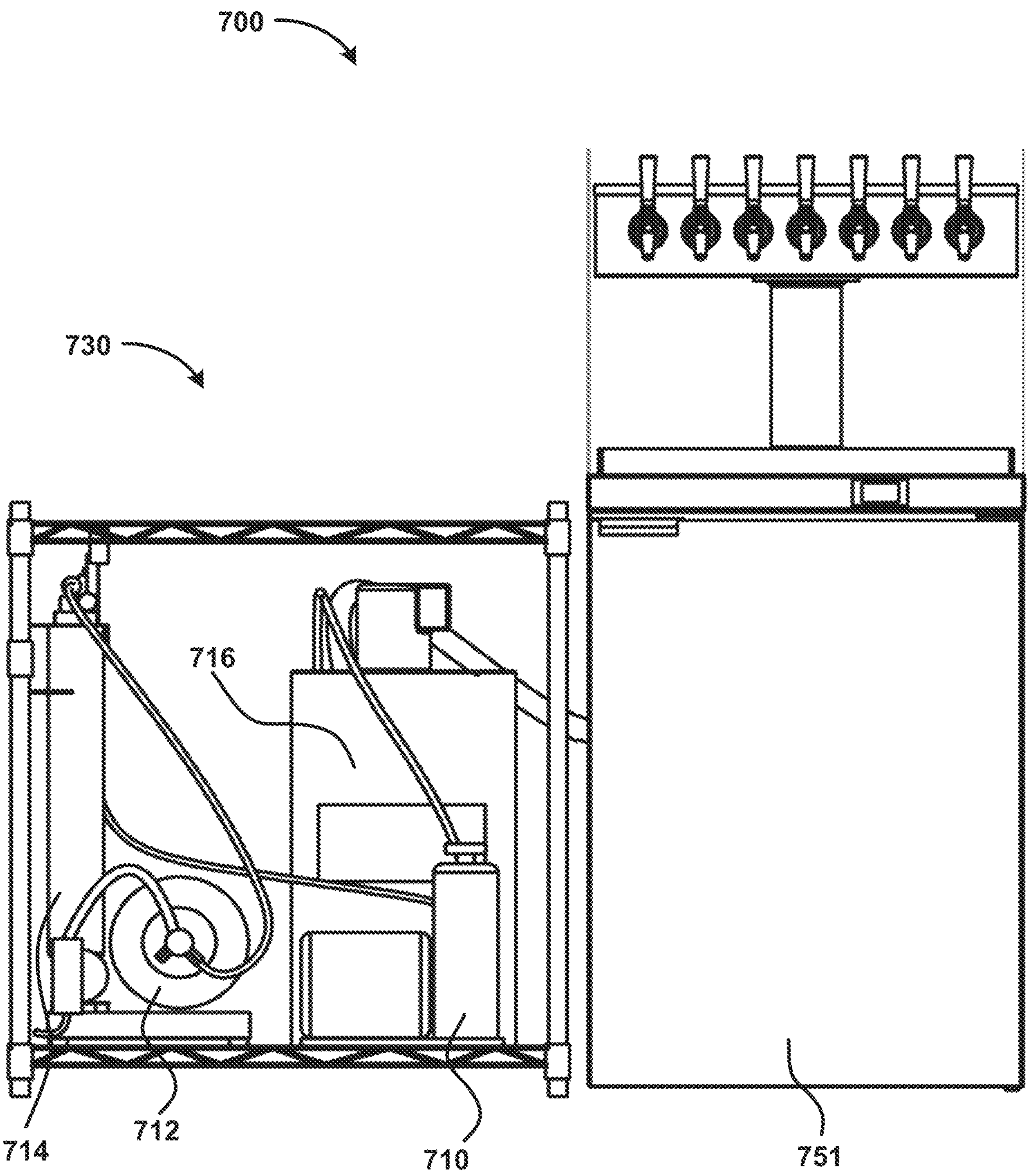
FIG. 10 is a depiction of an example of a front view of an attachment and the liquid dispensing system depicted in FIG. 7, according to an embodiment.

In some embodiments, the liquid dispensing system 700 can include or be coupled to a third liquid source 730 that includes a chiller assembly. The third liquid source 730 can be the same or similar in structure and/or function to any of the third liquid sources described herein. As shown in FIG. 10, which is a front view of the liquid dispensing system 700, the third liquid source 730 can include a filter 714, a booster 712, a carbonator 710, and a chiller 716. The filter 714 can be configured to filter a liquid (e.g., water, carbonated water, pressurized and carbonated water) to remove activated carbon.

As used in this specification, the singular forms "a," "an" and "the" include plural referents unless the context clearly dictates otherwise. Thus, for example, the term "a device" is intended to mean a single device or a combination of devices, "a network" is intended to mean one or more networks, or a combination thereof.

As used herein, the terms "about" and "approximately" generally mean plus or minus 10% of the value stated. For example, about 0.5 would include 0.45 and 0.55, about 10 would include 9 to 11, about 1000 would include 900 to 1100, etc.

References in the specification to "one embodiment," "an embodiment," "an example embodiment," "some embodiments," or the like, indicate that the embodiment(s) described may include one or more particular features, structures, or characteristics, but it shall be understood that such particular features, structures, or characteristics may or may not be common to each and every disclosed embodiment of the present disclosure herein. Moreover, such phrases do not necessarily refer to any one particular embodiment per se. As such, when one or more particular features, structures, or characteristics is described in connection with an embodiment or embodiments, as the case may be, it is submitted that it is within the knowledge of those skilled in the art to affect such one or more features, structures, or characteristics in connection with other one or more embodiments, where applicable or when such embodiments are not exclusive, whether or not explicitly described.

Detailed embodiments of the present disclosure are disclosed herein for purposes of describing and illustrating claimed structures and methods that may be embodied in various forms, and are not intended to be exhaustive in any way, or limited to the disclosed embodiments. Many modifications and variations will be apparent without departing from the scope of the disclosed embodiments. The terminology used herein was chosen to best explain the principles of the one or more embodiments, practical applications, or technical improvements over current technologies, or to enable understanding of the embodiments disclosed herein. As described, details of well-known features and techniques may be omitted to avoid unnecessarily obscuring the embodiments of the present disclosure.

While the embodiments have been particularly shown and described, it will be understood that various changes in form and details may be made. Although various embodiments have been described as having particular features and/or combinations of components, other embodiments are possible having a combination of any features and/or components from any of embodiments as discussed above. For example, where schematics and/or embodiments described above indicate certain components arranged in certain orientations or positions, the arrangement of components may be modified.

Where methods and/or events described above indicate certain events and/or procedures occurring in certain order, the ordering of certain events and/or procedures may be modified. Additionally, certain events and/or procedures may be performed concurrently in a parallel process when possible, as well as performed sequentially as described above. Moreover, the specific configurations of the various components can also be varied. For example, the size and specific shape of the various components can be different from the embodiments shown, while still providing the functions as described herein. More specifically, the size and shape of the various components can be specifically selected for a desired or intended usage. Thus, it should be understood that the size, shape, and/or arrangement of the embodiments and/or components thereof can be adapted for a given use unless the context explicitly states otherwise.

While some embodiments and/or implementations have been described and illustrated herein, a variety of other means and/or structures for performing the function and/or obtaining the results and/or one or more of the advantages is possible. More generally, parameters, dimensions, materials, and configurations described herein are meant to be exemplary and that the actual parameters, dimensions, materials, and/or configurations will depend upon the specific application or applications for which the inventive teachings is/are used. It is, therefore, to be understood that the foregoing embodiments are presented by way of example only and that, within the scope of the appended claims and equivalents thereto; and that embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually exclusive or inconsistent, is included within the scope of the present disclosure.

What is claimed is:

1. A system, comprising:
- a first pump configured to be fluidically coupled to a source of a first liquid including a high density fermented beverage;
- a second pump configured to be fluidically coupled to a source of a second liquid including a carrier liquid and a substance having bitterness characteristics;
- a controller operatively coupled to the first pump and the second pump such that the controller can control a first flow rate of the first pump and a second flow rate of the second pump;
- a valve configured to be coupled to a source of a third liquid including pressurized carbonated water;
- a flow connector fluidically coupled to the first pump, the second pump, and the valve, the flow connector configured to receive the first liquid, the second liquid, and the third liquid, the flow connector configured to be fluidically coupled to a fluid dispenser such that a fourth liquid including a combination of the first liquid, the second liquid, and the third liquid can travel from the flow connector to the fluid dispenser; and
- a pressure sensor disposed downstream of the flow connector, the pressure sensor configured to detect a fluid pressure level downstream of the pressure sensor being below a threshold fluid pressure level, the controller configured to activate the first pump and the second pump in response to the pressure sensor detecting that the fluid pressure level is below the threshold fluid pressure level.

2. The system of claim 1, wherein the carrier liquid is grain alcohol.

3. The system of claim 1, wherein the carrier liquid is water.

4. The system of claim 1, wherein the carrier liquid is grain alcohol, the high density fermented beverage includes a first quantity of alcohol per unit volume, and the fourth liquid includes a second quantity of alcohol per unit volume that is greater than the first quantity of alcohol per unit volume.

5. The system of claim 4, wherein the first quantity of alcohol per unit volume is about one sixth of the second quantity of alcohol per unit volume.

6. The system of claim 1, wherein at least one of the first pump or the second pump is a peristaltic pump.

7. The system of claim 1, wherein the first liquid has a first quantity of IBUs and the fourth liquid has a second quantity of IBUs higher than the first quantity of IBUs.

8. The system of claim 1, wherein the substance having bitterness characteristics includes at least one of an iso-alpha acid or an iso-beta acid.

9. A system, comprising:
- a plurality of liquid input sets, each liquid input set including a source of a first liquid, a source of a second liquid, and a container within which the source of the first liquid and the source of the second liquid are disposed, the first liquid including a high density fermented beverage, the second liquid including a carrier liquid and a substance having bitterness characteristics;
- a plurality of pumping assemblies, each pumping assembly including a first pump configured to be fluidically coupled to a source of a first liquid of a liquid input set of the plurality of liquid input sets, a second pump configured to be fluidically coupled to a source of a second liquid of the liquid input set of the plurality of liquid input sets, and a flow connector configured to be fluidically coupled to the first pump, the second pump, and a source of pressurized carbonated water, each flow connector configured to be fluidically coupled to a fluid dispenser such that a combined liquid including the first liquid, the second liquid, and the pressurized carbonated water can be dispensed from the fluid dispenser; and
- a controller operatively coupled to the plurality of pumping assemblies such that the controller can control a flow rate of each pump included in each pumping assembly of the plurality of pumping assemblies, the controller and the plurality of pumping assemblies disposed on a support rack.

10. The system of claim 9, wherein each container of the plurality of liquid input sets is formed of cardboard.

11. The system of claim 9, further comprising a housing defining an interior and including a plurality of shelves, and wherein each liquid input set of the plurality of liquid input sets is disposed within the interior of the housing on a shelf of the housing and the support rack is configured to be disposed within the interior.

12. The system of claim 11, wherein a plurality of fluid dispensers are coupled to an outer surface of the housing, each fluid dispenser of the plurality of fluid dispensers being fluidly coupled to a flow connector of a pumping assembly of the plurality of pumping assemblies.

13. A method, comprising:
- initiating, in response to a pressure sensor disposed downstream of a fluid connector detecting a pressure level downstream of the pressure sensor being below a threshold fluid pressure level, pumping of a first liquid from a source of the first liquid to the fluid connector at a first flow rate and pumping of a second liquid from a source of the second liquid to the fluid connector at a second flow rate, the first liquid being a high density fermented beverage, the second liquid including a carrier liquid and a substance having bitterness characteristics; and
- dispensing a combined liquid including the first liquid, the second liquid, and a third liquid received by the fluid connector from a source of the third liquid, the third liquid being pressurized carbonated water.

14. The method of claim 13, wherein the dispensing the combined liquid is in response to a pulling of a lever of a tap, the combined liquid being dispensed from the tap.

15. The method of claim 13, wherein the first liquid, the second liquid, and the third liquid combine simultaneously within the fluid connector to form the combined liquid.

16. The method of claim 13, wherein the first liquid or the second liquid is combined with the third liquid before being combined with the other of the first liquid or the second liquid.

17. The method of claim 13, further comprising transitioning a valve from a closed state to an open state such that the third liquid flows from the source of the third liquid to the fluid connector.

18. The method of claim 13, wherein the third liquid is pressurized carbonated water.

* * * * *